(12) United States Patent
Ogura et al.

(10) Patent No.: US 12,386,094 B2
(45) Date of Patent: Aug. 12, 2025

(54) PROCESSING APPARATUS, ESTIMATION APPARATUS, AND PROCESSING METHOD

(71) Applicant: NEC Corporation, Tokyo (JP)

(72) Inventors: Kazumine Ogura, Tokyo (JP); Masayuki Ariyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 356 days.

(21) Appl. No.: 17/797,488

(22) PCT Filed: Feb. 19, 2020

(86) PCT No.: PCT/JP2020/006445
§ 371 (c)(1),
(2) Date: Aug. 4, 2022

(87) PCT Pub. No.: WO2021/166104
PCT Pub. Date: Aug. 26, 2021

(65) Prior Publication Data
US 2023/0057701 A1    Feb. 23, 2023

(51) Int. Cl.
*G01V 3/12*     (2006.01)
*G06F 18/214*   (2023.01)
*G06F 18/40*    (2023.01)

(52) U.S. Cl.
CPC .............. *G01V 3/12* (2013.01); *G06F 18/214* (2023.01); *G06F 18/40* (2023.01)

(58) Field of Classification Search
CPC .......... G01V 3/12; G06F 18/40; G06F 18/214
See application file for complete search history.

(56) References Cited

U.S. PATENT DOCUMENTS

| 2012/0051629 A1 | 3/2012 | Ueki et al. |
| 2016/0232769 A1 | 8/2016 | Jarvi et al. |

(Continued)

FOREIGN PATENT DOCUMENTS

| JP | 2005-045712 A | 2/2005 | |
| JP | 2006177907 A * | 7/2006 | ........... G01S 13/536 |

(Continued)

OTHER PUBLICATIONS

International Search Report for PCT Application No. PCT/JP2020/006445, mailed on May 12, 2020.

(Continued)

*Primary Examiner* — Vladimir Magloire
*Assistant Examiner* — Maxine Mckenzie Phillips

(57) ABSTRACT

The present invention provides a processing apparatus (10) including an electromagnetic wave transmission/reception unit (11) that irradiates an electromagnetic wave from a transmission antenna, and receives a reflection wave by a reception antenna; a label determination image generation unit (12) that generates a label determination image, based on a signal of the received reflection wave; a learning image generation unit (13) that generates a learning image, based on a signal being a part of a signal of the receive reflection wave, and less than a signal to be used in generation of the label determination image; a label determination unit (14) that determines a label, based on the label determination image; and a training data generation unit (15) that generates training data in which the learning image and the label are associated, and causing a training data storage unit (16) to store the generated training data.

15 Claims, 17 Drawing Sheets

(56) References Cited

U.S. PATENT DOCUMENTS

2020/0025877 A1* 1/2020 Sarkis .................. G01S 7/412
2020/0167689 A1* 5/2020 Pojman ............... G06V 20/176

FOREIGN PATENT DOCUMENTS

| JP | 2017-537399 A | 12/2017 | | |
|----|---------------|---------|---|---|
| JP | 2019101924 A * | 6/2019 | | |
| JP | 6949273 B2 * | 10/2021 | | |
| WO | 2010/125916 A1 | 11/2010 | | |
| WO | WO-2018147025 A1 * | 8/2018 | ............ | G01N 22/00 |
| WO | 2019/229910 A1 | 12/2019 | | |

OTHER PUBLICATIONS

"Prescription for Widely Rooting 'Advanced Airport Security' in Japan—Airport Security Future Image Study Group, Survey Report. Summary Version", [online], Jul. 18, 2017, Airport Security Future Image Study Group, [searched on Sep. 18. 2019], Internet <URL: https://www.nttdata-strategy.com/aboutus/newsrelease/170718/report.pdf>, pp. 1-8.

* cited by examiner

PROCESSING APPARATUS, ESTIMATION APPARATUS, AND PROCESSING METHOD

This application is a National Stage Entry of PCT/JP2020/006445 filed on Feb. 19, 2020, the contents of all of which are incorporated herein by reference, in their entirety.

TECHNICAL FIELD

The present invention relates to a processing apparatus, an estimation apparatus, a processing method, and an estimation method.

BACKGROUND ART

Non-Patent Document 1 discloses, for security enhancement, tracking a suspicious person by marking, detecting a suspicious object by a microwave radar, identifying a person by face authentication, performing a belongings inspection by a transparent image, and the like.

Patent Document 1 discloses performing a belongings inspection of a passenger by using various techniques such as a metal detector and an X-ray image, controlling opening and closing of a gate according to an inspection result, controlling a direction of travel of a passenger, and the like.

Patent Document 2 discloses, when an intruder is detected by a millimeter wave sensor, acquiring a zoom image of the intruder by directing a line of sight of a surveillance camera to a detection position of the intruder, and the like.

RELATED DOCUMENT

Patent Document

[Patent Document 1] Japanese Patent Application Publication (Translation of PCT Application) No. 2017-537399
[Patent Document 2] Japanese Patent Application Publication No. 2005-45712

Non-Patent Document

[Non-Patent Document 1] "Prescription for Widely Rooting" Advanced Airport Security" in Japan—Airport Security Future Image Study Group, Survey Report, Summary Version", [online], Jul. 18, 2017, Airport Security Future Image Study Group, [searched on Sep. 18, 2019], Internet <URL: https://www.nttdata-strategy.com/aboutus/news-release/170718/report.pdf>

DISCLOSURE OF THE INVENTION

Technical Problem

The inventor of the present invention has found the following subject regarding object detection based on an image of an electromagnetic wave (example: a microwave, a millimeter wave, a terahertz wave, and the like).

First, the inventor of the present invention has come up with a technique for, in a technique for estimating an object included in an image, based on an estimation model generated by a labeled image (training data), achieving reduction of processing load on a computer, miniaturization of a sensor device and reduction of cost burden by reduction of the number of transmission/reception antennas, shortening of an irradiation time and suppression of motion blur by reduction of the number of transmission antennas, and the like by reducing a signal of an electromagnetic wave (reducing an amount of data) for use in image generation within a range where an estimation result having sufficient accuracy is acquired.

However, when an amount of data is reduced based on a determination as to whether a computer can recognize an object included in an image with sufficient accuracy, sharpness of the image may be lowered to a level at which a person cannot recognize the object included in the image. In this case, it becomes difficult, in a training data generation scene, to perform a labeling operation by hand that "a person browses an image, recognizes an object included in the image, and labels the image, based on a recognition result".

A subject of the present invention is to improve, in a technique for estimating an object included in an image, based on an estimation model generated by a labeled image (training data) based on a signal of an electromagnetic wave, difficulty in a labeling operation resulting from reduction of a signal of an electromagnetic wave (reduction of an amount of data) for use in image generation within a range where an estimation result having sufficient accuracy is acquired.

Solution to Problem

The present invention provides a processing apparatus including:
an electromagnetic wave transmission/reception means for irradiating an electromagnetic wave from a transmission antenna, and receiving a reflection wave by a reception antenna;
a label determination image generation means for generating a label determination image, based on a signal of the received reflection wave;
a learning image generation means for generating a learning image, based on a signal being a part of a signal of the received reflection wave, and less than a signal to be used in generation of the label determination image;
a label determination means for determining a label, based on the label determination image; and
a training data generation means for generating training data in which the learning image and the label are associated, and causing training data storage means to store the generated training data.

Further, the present invention provides an estimation apparatus including:
an estimation model storage means for storing an estimation model generated by a processing apparatus including
an electromagnetic wave transmission/reception means for irradiating an electromagnetic wave from a transmission antenna, and receiving a reflection wave by a reception antenna,
a label determination image generation means for generating a label determination image, based on a signal of the received reflection wave,
a learning image generation means for generating a learning image, based on a signal being a part of a signal of the received reflection wave, and less than a signal to be used in generation of the label determination image,
a label determination means for determining a label, based on the label determination image,
a training data generation means for generating training data in which the learning image and the label are associated, and causing a training data storage means to store the generated training data, and
an estimation model generation means for generating the estimation model by machine learning based on the training data stored by the training data storage means;

an estimation electromagnetic wave transmission/reception means for irradiating an electromagnetic wave from an estimation transmission antenna, and receiving a reflection wave by an estimation reception antenna;

an estimation image generation means for generating an estimation image, based on a signal of the received reflection wave; and an estimation means for estimating an object included in the estimation image, based on the estimation image and the estimation model.

Further, the present invention provides a processing method including:

by a computer, irradiating an electromagnetic wave from a transmission antenna, and receiving a reflection wave by a reception antenna;

generating a label determination image, based on a signal of the received reflection wave;

generating a learning image, based on a signal being a part of a signal of the received reflection wave, and less than a signal to be used in generation of the label determination image;

determining a label, based on the label determination image; and generating training data in which the learning image and the label are associated, and causing a training data storage means to store the generated training data.

Further, the present invention provides an estimation method including:

by a computer, storing an estimation model generated by a processing apparatus including an electromagnetic wave transmission/reception means for irradiating an electromagnetic wave from a transmission antenna, and receiving a reflection wave by a reception antenna, a label determination image generation means for generating a label determination image, based on a signal of the received reflection wave, a learning image generation means for generating a learning image, based on a signal being a part of a signal of the received reflection wave, and less than a signal to be used in generation of the label determination image, a label determination means for determining a label, based on the label determination image, a training data generation means for generating training data in which the learning image and the label are associated, and causing a training data storage means to store the generated training data, and an estimation model generation means for generating the estimation model by machine learning based on the training data stored by the training data storage means;

irradiating an electromagnetic wave from an estimation transmission antenna, and receiving a reflection wave by an estimation reception antenna;

generating an estimation image, based on a signal of the received reflection wave; and estimating an object included in the estimation image, based on the estimation image and the estimation model.

Advantageous Effects of Invention

The present invention improves, in a technique for estimating an object included in an image, based on an estimation model generated by a labeled image (training data) based on a signal of an electromagnetic wave, difficulty in a labeling operation resulting from reduction of a signal of an electromagnetic wave (reduction of an amount of data) for use in image generation within a range where an estimation result having sufficient accuracy is acquired.

DESCRIPTION OF EMBODIMENTS

First Example Embodiment

"Overview of Estimation System"

First, an overview of an estimation system according to the present example embodiment is described. The estimation system according to the present example embodiment includes an estimation apparatus for performing a belongings inspection of a person present at any place such as an airport and a station, and a processing apparatus for generating an estimation model for use in the belongings inspection by machine learning.

Figure 1:
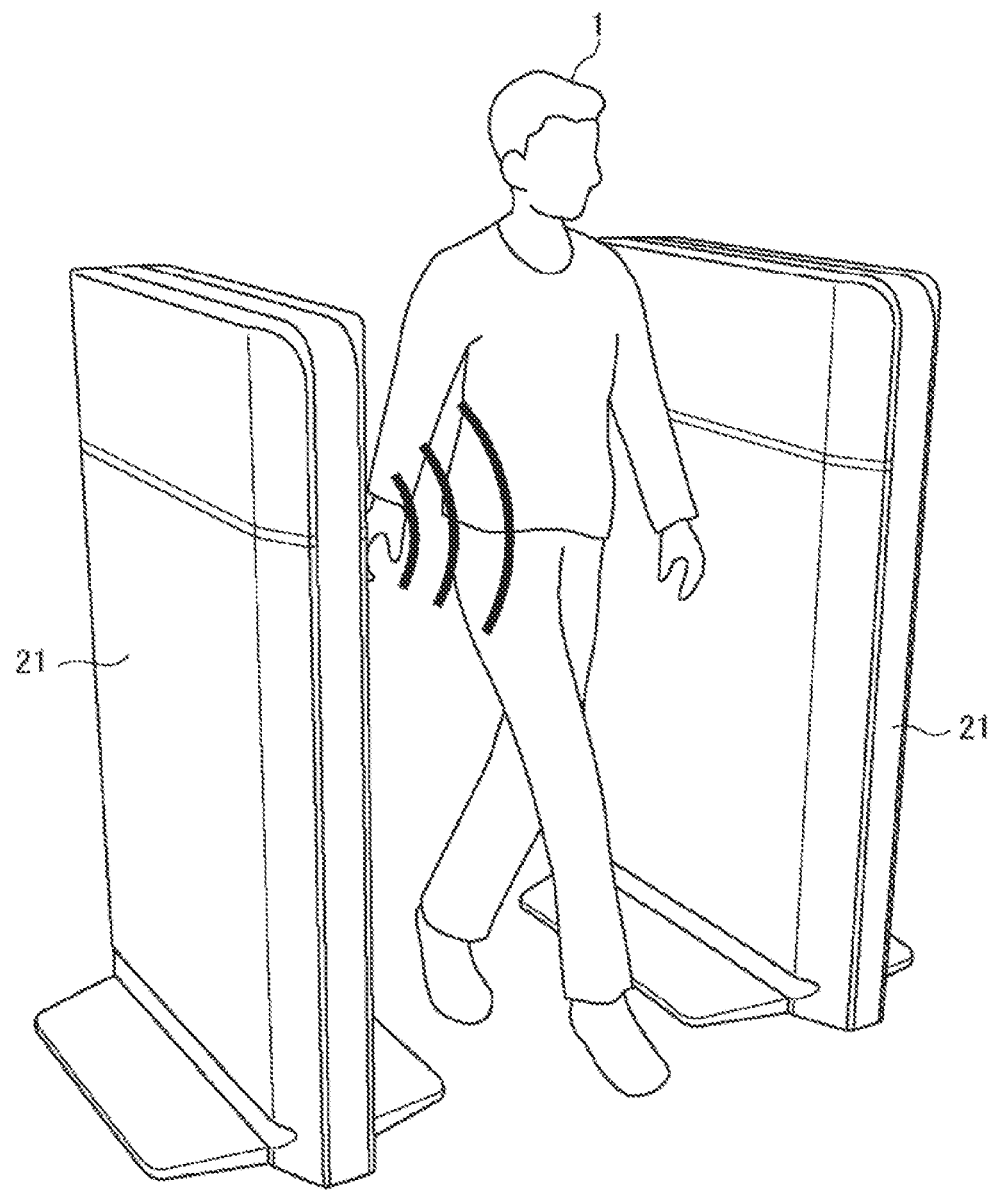
FIG. 1 is a diagram illustrating one example of a configuration of an estimation electromagnetic wave transmission/reception unit according to the present example embodiment.

For example, an estimation electromagnetic wave transmission/reception unit 21 (a part of the estimation apparatus) as illustrated in FIG. 1 is installed at any place such as an airport. The estimation electromagnetic wave transmission/reception unit 21 includes a transmission antenna that transmits an electromagnetic wave, and a reception antenna that receives an electromagnetic wave. The estimation electromagnetic wave transmission/reception unit 21 irradiates an electromagnetic wave toward a person 1 passing through a predetermined position, and receives a reflection wave of the electromagnetic wave. The estimation apparatus generates an image, based on a signal of the reflection wave, and estimates belongings of the person 1, based on the generated image, and an estimation model being generated in advance. In this way, the estimation apparatus enables performing a walkthrough type belongings inspection for the person 1 passing through a predetermined position.

Figure 2:
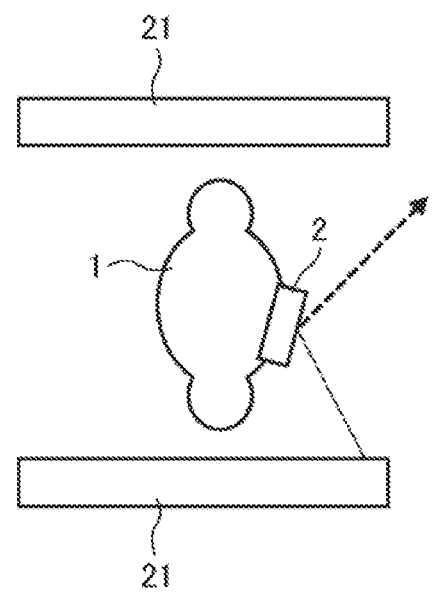
FIG. 2 is a diagram illustrating one example of a configuration of the estimation electromagnetic wave transmission/reception unit according to the present example embodiment.
Figure 3:
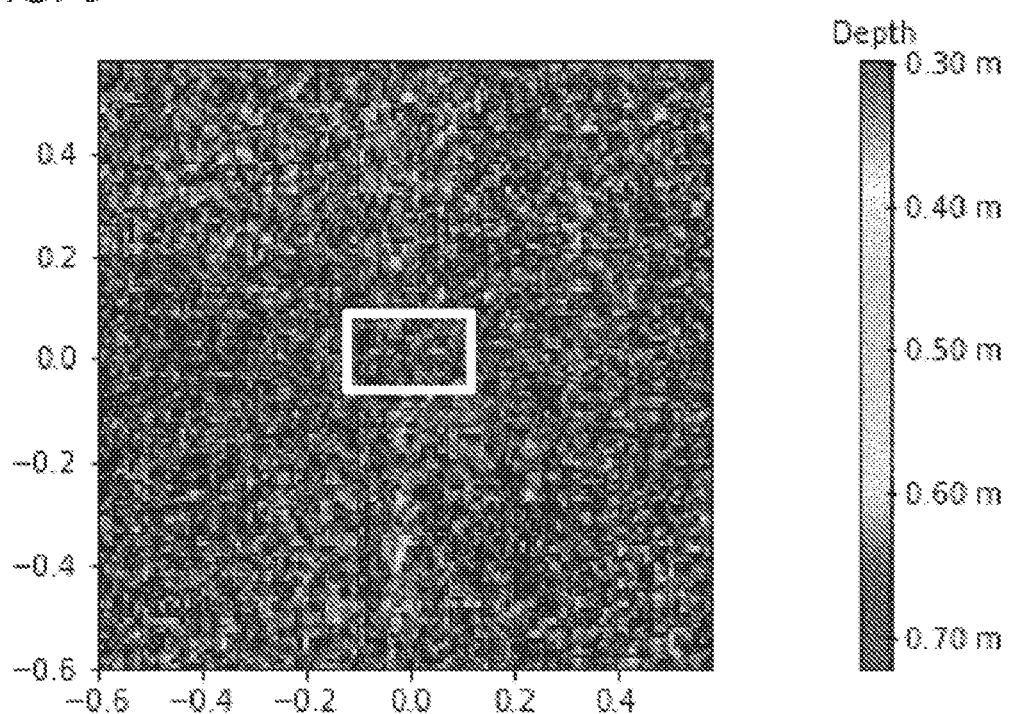
FIG. 3 is a diagram illustrating one example of an image to be generated by an estimation apparatus according to the present example embodiment.

FIG. 2 illustrates one example of a top plan view of the estimation electromagnetic wave transmission/reception unit 21. Further, FIG. 3 illustrates one example of an image generated based on a signal of a reflection wave received by the estimation electromagnetic wave transmission/reception unit 21. A portion indicated by a frame in FIG. 3 is a location where a gun (belongings 2) carried by a person 1 in FIG. 2 is present. It is difficult to recognize the gun in the portion indicated by the frame in FIG. 3 by a human eye. However, a computer can recognize, from the image illustrated in FIG. 3, the gun in the portion indicated by the frame with sufficient accuracy. Specifically, although a computer can recognize an object within an image to be generated based on a signal of a reflection wave received by the estimation electromagnetic wave transmission/reception unit 21 with sufficient accuracy, the image may have sharpness of a level at which a person cannot recognize the object within the image. In other words, the estimation electromagnetic wave transmission/reception unit 21 has a configuration capable of generating an image as described above.

Figure 4:
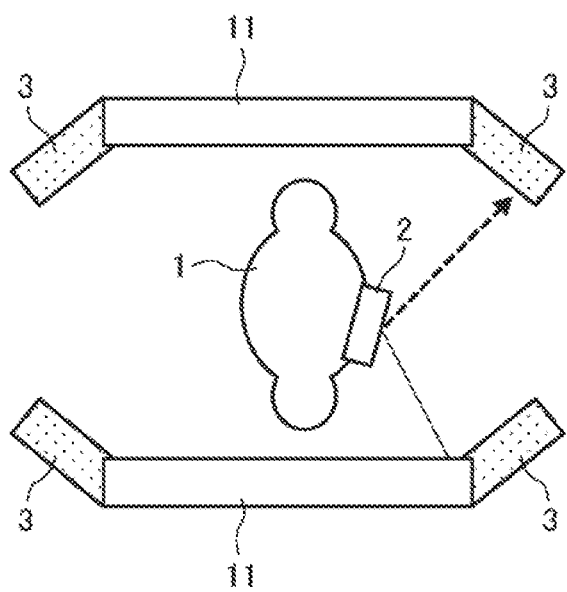
FIG. 4 is a diagram illustrating one example of a configuration of an electromagnetic wave transmission/reception unit according to the present example embodiment.

Next, FIG. 4 illustrates one example of a top plan view of an electromagnetic wave transmission/reception unit 11 to be used for generating training data (labeled image) in a scene where an estimation model is generated. The electromagnetic wave transmission/reception unit 11 includes a transmission antenna that transmits an electromagnetic wave, and a reception antenna that receives an electromagnetic wave. When FIG. 4 and FIG. 2 are compared, the electromagnetic wave transmission/reception unit 11 is different from the estimation electromagnetic wave transmission/reception unit 21 in a point that the electromagnetic wave transmission/reception unit 11 includes an added portion 3. By presence of a transmission antenna and a reception antenna in the added portion 3, it is possible to receive a reflection wave from the belongings 2 with less leakage, and generate an image representing the belongings 2 more clearly.

Figure 5:
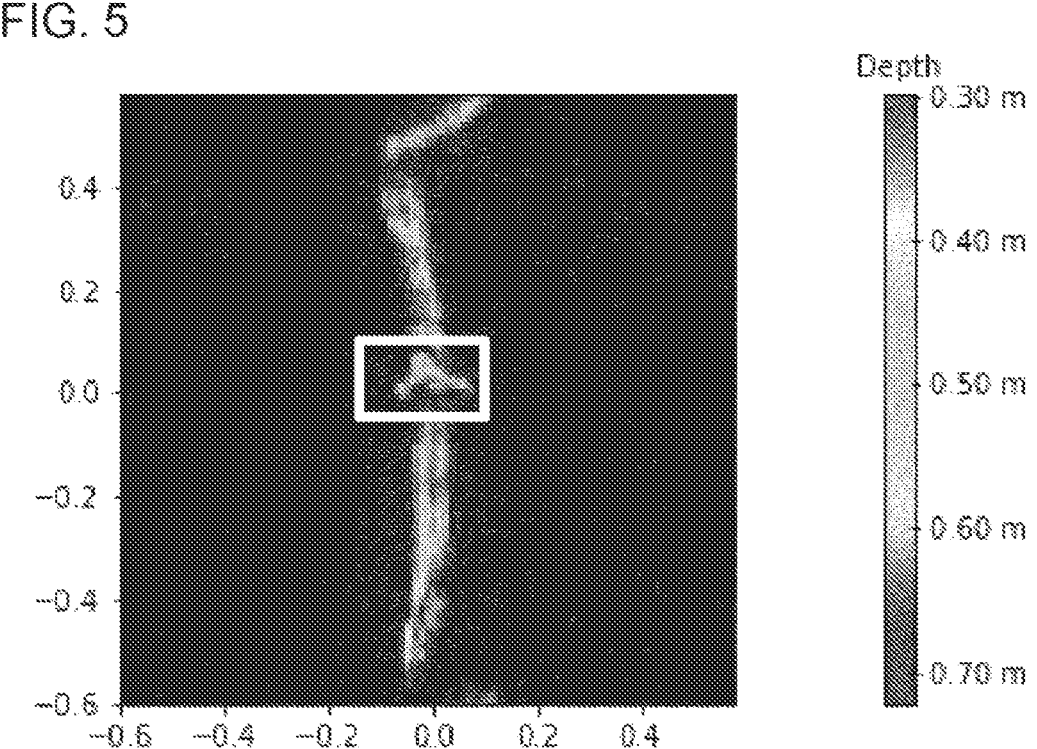
FIG. 5 is a diagram illustrating one example of an image to be generated by a processing apparatus according to the present example embodiment.

FIG. 5 illustrates one example of an image generated based on a signal of a reflection wave received by the electromagnetic wave transmission/reception unit 11. A portion indicated by a frame in FIG. 5 is a location where a gun (belongings 2) carried by a person 1 in FIG. 4 is present. In a case of the example, even a human eye can recognize, from a shape of the gun, the gun in the portion indicated by the frame in FIG. 5. It is natural that a computer can recognize, from the image illustrated in FIG. 5, the gun in the portion indicated by the frame with sufficient accuracy.

A processing apparatus 10 generates a label determination image, and a learning image, based on a signal of a reflection wave received by the electromagnetic wave transmission/reception unit 11 as described above.

Specifically, the processing apparatus 10 generates a label determination image by using all or a major part of a signal of a reflection wave received by the electromagnetic wave transmission/reception unit 11. A label determination image to be generated as described above becomes, as illustrated in FIG. 5, an image having sharpness of a level at which a person can recognize an object within the image.

Further, the processing apparatus 10 generates a learning image by using a part of a signal of a reflection wave received by the electromagnetic wave transmission/reception unit 11. A learning image to be generated as described above has, as illustrated in FIG. 4, sharpness of a level at which a person cannot recognize an object within the image, although a computer can recognize the object within the image with sufficient accuracy. Specifically, a learning image has sharpness of substantially the same level as that of an image to be used in estimation processing by an estimation apparatus 20.

Further, when determining a label, based on the above-described label determination image, the processing apparatus 10 generates training data in which the above-described learning image and the above-described label are associated, and causes a storage apparatus to store the generated training data.

In this way, the estimation system according to the present example embodiment sufficiently reduces, within a range where an estimation result having sufficient accuracy is acquired by a computer, an amount of data to be used in generation of an image to be used in processing of estimating belongings of the person 1 (an amount of data to be used in generation of an image to be used in estimation processing by the estimation apparatus 20, an amount of data to be used in generation of an image serving as training data). Consequently, reduction of processing load on a computer, miniaturization of a sensor device and reduction of cost burden by reduction of the number of transmission/reception antennas, shortening of an irradiation time and suppression of motion blur by reduction of the number of transmission antennas, and the like are achieved.

Further, the estimation system according to the present example embodiment performs irradiation of an electromagnetic wave onto an object and reception of a reflection wave in a scene where an estimation model is generated by using the electromagnetic wave transmission/reception unit 11 having a configuration capable of acquiring a large amount of data on a reflection wave as compared with the estimation electromagnetic wave transmission/reception unit 21 being actually installed and used at an airport and the like. Further, the estimation system according to the present example embodiment generates, based on a signal of a reflection wave received by the electromagnetic wave transmission/reception unit 11, a label determination image having sharpness of a level at which a person can recognize an object within an image, and a learning image having sharpness of substantially the same level as that of an image to be used in estimation processing by the estimation apparatus 20. Further, training data are generated by associating a label determined based on the label determination image and the learning image. According to a configuration as described above, even when an amount of data to be used in generation of an image to be used in processing of estimating belongings of the person 1 as described above is reduced, it is possible to perform a labeling operation without a problem.

"Configuration of Estimation Apparatus"

Next, a configuration of an estimation apparatus is described in detail. First, one example of a hardware configuration of the estimation apparatus is described. Each functional unit included in the estimation apparatus is achieved by any combination of hardware and software, mainly including a central processing unit (CPU) of any computer, a memory, a program loaded in a memory, a storage unit (capable of storing, in addition to a program stored in advance at a shipping stage of an apparatus, a program downloaded from a storage medium such as a compact disc (CD), a server on the Internet, and the like) such as a hard disk storing the program, and an interface for network connection. Further, it is understood by a person skilled in the art that there are various modification examples as a method and an apparatus for achieving the configuration.

Figure 6:
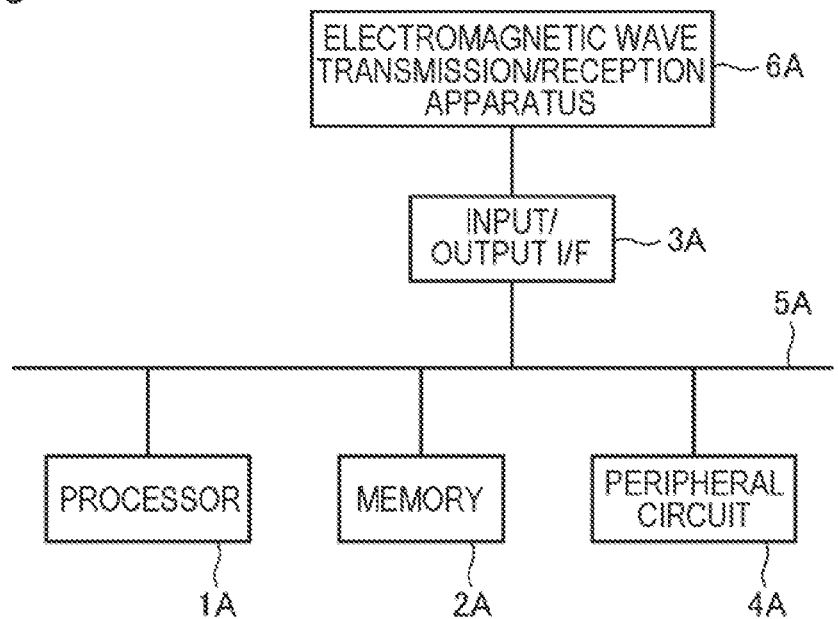
FIG. 6 is a diagram illustrating one example of a hardware configuration of the processing apparatus and an estimation apparatus according to the present example embodiment.

FIG. 6 is a block diagram illustrating a hardware configuration of the estimation apparatus. As illustrated in FIG. 6, the estimation apparatus includes a processor 1A, a memory 2A, an input/output interface 3A, a peripheral circuit 4A, a bus 5A, and an electromagnetic wave transmission/reception apparatus 6A. The peripheral circuit 4A includes various modules. The estimation apparatus may not include the peripheral circuit 4A. Note that, the estimation apparatus may be constituted of a plurality of apparatuses that are physically and/or logically separated, or may be constituted of one apparatus that is physically and/or logically integrated. In a case where the estimation apparatus is constituted of a plurality of apparatuses that are physically and/or logically separated, each of the plurality of apparatuses may include the above-described hardware configuration.

The bus 5A is a data transmission path along which the processor 1A, the memory 2A, the peripheral circuit 4A, and the input/output interface 3A mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. As one example of the external sensor, the electromagnetic wave transmission/reception apparatus 6A is illustrated. The electromagnetic wave transmission/reception apparatus 6A includes a transmission antenna that transmits an electromagnetic wave, and a reception antenna that receives an electromagnetic wave. The electromagnetic wave transmission/reception apparatus 6A is, for example, a radar. The input apparatus is, for example, a keyboard, a mouse, a microphone, a physical button, a touch panel, and the like. The output apparatus is, for example, a display, a speaker, a printer, a mailer, and the like. The processor 1A can issue a command to each module, and perform an arithmetic operation, based on an arithmetic operation result of each module.

Figure 7:
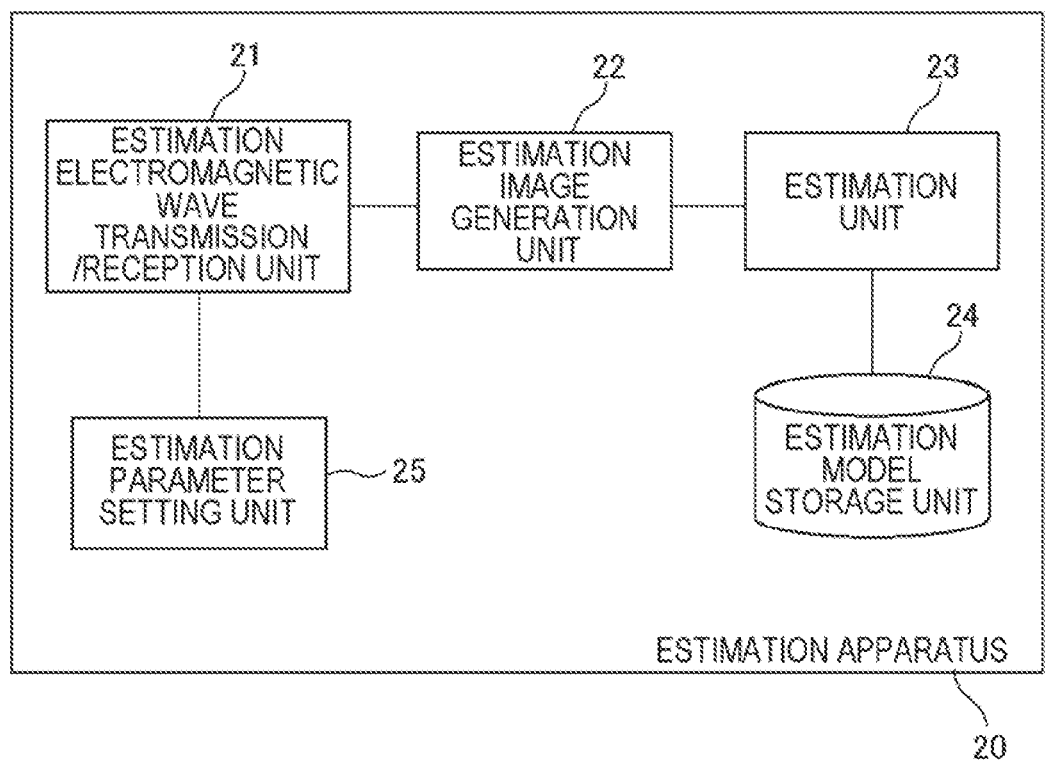
FIG. 7 is one example of a functional block diagram of the estimation apparatus according to the present example embodiment.

Next, a functional configuration of the estimation apparatus is described. FIG. 7 illustrates one example of a functional block diagram of an estimation apparatus 20. As illustrated in FIG. 7, the estimation apparatus 20 includes the estimation electromagnetic wave transmission/reception unit 21, an estimation image generation unit 22, an estimation unit 23, an estimation model storage unit 24, and an estimation parameter setting unit 25.

The estimation model storage unit 24 stores an estimation model generated by the processing apparatus 10. Details of the estimation model are made clear by the following description on a configuration of the processing apparatus 10.

Figure 8:
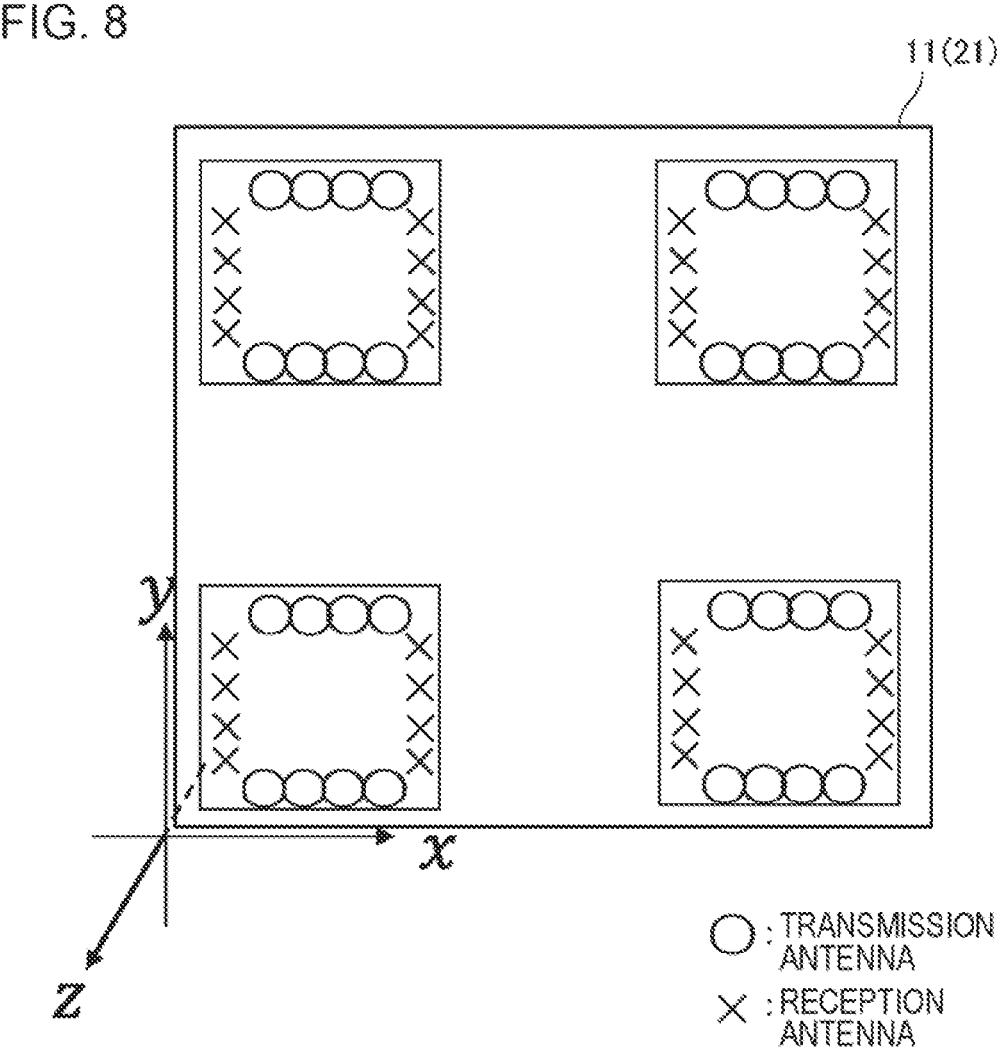
FIG. 8 is a diagram illustrating one example of a manner of arrangement of a transmission antenna and a reception antenna according to the present example embodiment.

The estimation electromagnetic wave transmission/reception unit 21 is configured by including an estimation transmission antenna and an estimation reception antenna. Further, the estimation electromagnetic wave transmission/reception unit 21 irradiates an electromagnetic wave from the estimation transmission antenna, and receives a reflection wave by the estimation reception antenna. The estimation electromagnetic wave transmission/reception unit 21 is, for example, a radar. An electromagnetic wave to be transmitted and received by the estimation electromagnetic wave transmission/reception unit 21 is, for example, an electromagnetic wave (example: a microwave, a millimeter wave, a terahertz wave, and the like) having a wavelength of equal to or more than 30 micrometers and equal to or less than one meter. The estimation electromagnetic wave transmission/reception unit 21 can be configured by adopting any technique. For example, as illustrated in an example in FIG. 8, the estimation electromagnetic wave transmission/reception unit 21 may be a sensor panel in which a plurality of estimation transmission antennas and a plurality of estimation reception antennas are arranged. The plurality of estimation transmission antennas irradiate an electromagnetic wave in a predetermined order by shifting a timing from one another. Further, all the plurality of estimation reception antennas receive a reflection wave of the electromagnetic wave.

Note that, in the example illustrated in FIG. 1, the estimation electromagnetic wave transmission/reception unit 21 is constituted of two sensor panels facing each other, but the estimation electromagnetic wave transmission/reception unit 21 may be constituted of one sensor panel, or the estimation electromagnetic wave transmission/reception unit 21 may be constituted of three or more sensor panels. Further, in the example illustrated in FIG. 1, although a gate is formed by two sensor panels in such a way that the person 1 is allowed to pass through a clearance between the two sensor panels, for example, a sensor panel may be embedded in a wall or the like in such a way that a person cannot recognize presence of the sensor panel.

Figure 9:
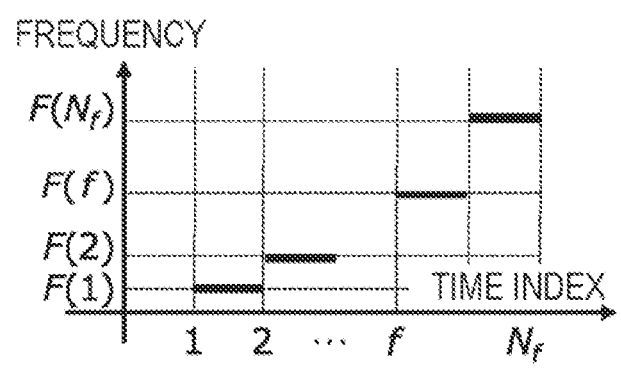
FIG. 9 is a diagram illustrating one example of a manner of irradiation of an electromagnetic wave from a plurality of transmission antennas according to the present example embodiment.

Referring back to FIG. 7, the estimation parameter setting unit 25 performs settings of various parameters regarding transmission and reception of an electromagnetic wave by the estimation electromagnetic wave transmission/reception unit 21. For example, the estimation parameter setting unit 25 sets an irradiation order of a plurality of estimation transmission antennas, a frequency of an electromagnetic wave to be irradiated by each estimation transmission antenna, an irradiation time of each estimation transmission antenna, and the like. For example, as illustrated in FIG. 9, it is possible to change a frequency of an electromagnetic wave to be irradiated from a plurality of estimation transmission antennas according to time. The estimation parameter setting unit 25 can perform settings of the above-described various parameters, based on user input. The estimation electromagnetic wave transmission/reception unit 21 performs transmission and reception of an electromagnetic wave, based on various parameters set by the estimation parameter setting unit 25.

The estimation image generation unit 22 generates an estimation image, based on a signal of a reflection wave received by the estimation electromagnetic wave transmission/reception unit 21. The estimation image generation unit 22 can generate an estimation image, based on, for example, the following equation (1).

$$vimg(v) = \sum_{m}^{N_{tx}} \sum_{n}^{N_{rx}} \sum_{f}^{N_f} s_{m,n,f} * e^{\frac{2\pi j \cdot F(f)}{c} \cdot \{|\vec{R}_m - \vec{v}| + |\vec{R}_n - \vec{v}|\}} \quad \text{[Equation 1]}$$

Note that, an estimation image is three-dimensional, and is constituted of a set of values of each of a plurality of voxels. v vector indicates a center position of one voxel. $R_m$ vector indicates a position of a transmission antenna (estimation transmission antenna). $R_n$ vector indicates a position of a reception antenna (estimation reception antenna). $S_{m,n,f}$ indicates a signal of an electromagnetic wave (reflection wave) of a frequency f being irradiated from a transmission antenna m and received by a reception antenna n. F(f) indicates a frequency at a time index f. j is an imaginary number, and c is a velocity of light.

FIG. 3 illustrates one example of an estimation image generated by the estimation image generation unit 22. A portion indicated by a frame in FIG. 3 is a location where a gun is present. As illustrated in FIG. 3, an estimation image may have sharpness of a level at which a computer can recognize an object within the image with sufficient accuracy but a person cannot recognize the object within the image. In other words, the estimation electromagnetic wave transmission/reception unit 21 has a configuration (such as the number of estimation transmission antennas, the number of estimation reception antennas, a manner of arrangement, a frequency for use, and the number of frequencies) capable of generating an image as described above.

The estimation unit 23 estimates an object included in an estimation image, based on the estimation image generated by the estimation image generation unit 22 and an estimation model stored in the estimation model storage unit 24.

Figure 10:
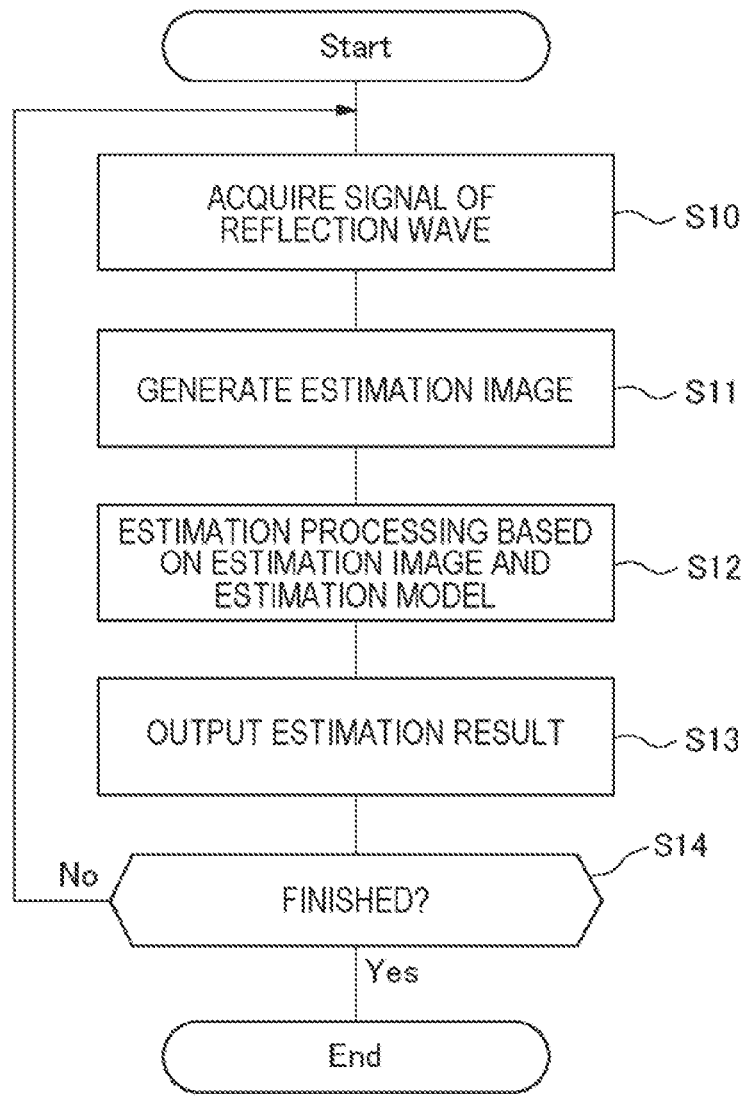
FIG. 10 is a flowchart illustrating one example of a flow of processing of the estimation apparatus according to the present example embodiment.

Next, one example of a flow of processing of the estimation apparatus 20 is described with reference to a flowchart in FIG. 10.

When processing is started, the estimation electromagnetic wave transmission/reception unit 21 repeats, at a predetermined interval, irradiation of an electromagnetic wave having a wavelength of equal to or more than 30 micrometers and equal to or less than one meter, and reception of a reflection wave. Then, when acquiring a signal of the above-described reflection wave output from the estimation electromagnetic wave transmission/reception unit 21 (S10), the estimation image generation unit 22 generates an estimation image, based on the signal (S11).

Next, the estimation unit 23 estimates an object included in the estimation image, based on the estimation image generated by the estimation image generation unit 22 in S11, and an estimation model stored in advance in the estimation model storage unit 24 (S12).

Then, the estimation apparatus 20 outputs an estimation result (S13). For example, the estimation apparatus 20 may output the estimation result via any output apparatus such as a display, a projection apparatus, a speaker, a printer, and a mailer. The estimation result includes information (such as a name) regarding an object being estimated to be included in the estimation image.

In addition to the above, in a case where the estimation apparatus 20 estimates that a predetermined object is included in an estimation image, the estimation apparatus 20 may perform warning processing. The warning processing is turning on a warning lamp, outputting a warning sound, outputting warning information via an output apparatus such as a display, and the like, but is not limited thereto. The predetermined object is an object carrying of which is not allowed at the place, and a hazardous object such as, for example, a gun and a knife is exemplified.

"Configuration of Processing Apparatus"

Details of a configuration of a processing apparatus are described. One example of a hardware configuration of the processing apparatus is similar to the above-describe one example of a hardware configuration of the estimation apparatus 20.

Figure 11:
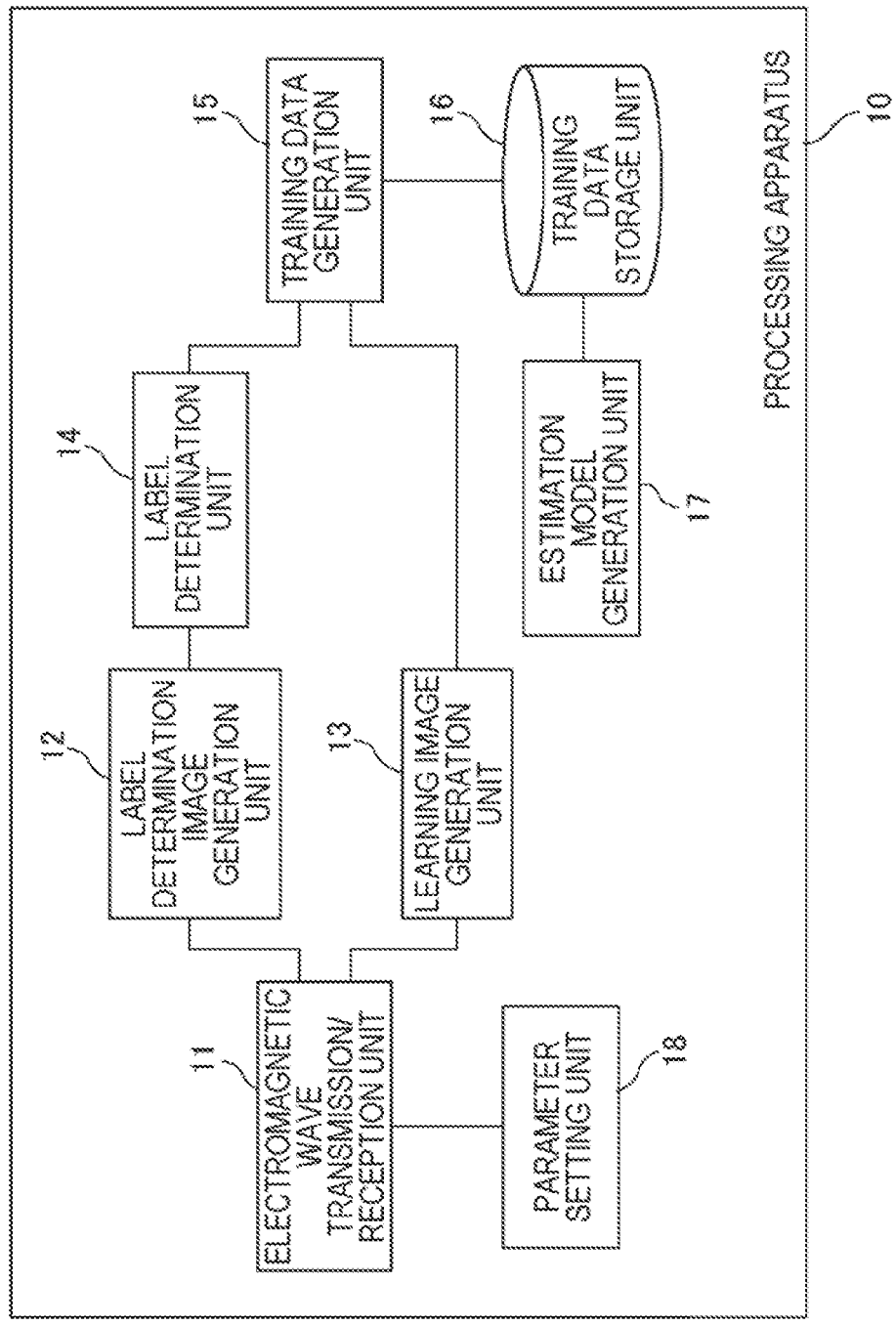
FIG. 11 is one example of a functional block diagram of the processing apparatus according to the present example embodiment.

Next, a functional configuration of the processing apparatus is described. FIG. 11 illustrates one example of a functional block diagram of the processing apparatus 10. As illustrated in FIG. 11, the processing apparatus 10 includes the electromagnetic wave transmission/reception unit 11, a label determination image generation unit 12, a learning image generation unit 13, a label determination unit 14, a training data generation unit 15, a training data storage unit 16, an estimation model generation unit 17, and a parameter setting unit 18.

The electromagnetic wave transmission/reception unit 11 is configured by including a transmission antenna and a reception antenna. Further, the electromagnetic wave transmission/reception unit 11 irradiates an electromagnetic wave from the transmission antenna, and receives a reflection wave by the reception antenna. The electromagnetic wave transmission/reception unit 11 is, for example, a radar. An electromagnetic wave to be transmitted and received by the electromagnetic wave transmission/reception unit 11 is, for example, an electromagnetic wave (example: a microwave, a millimeter wave, a terahertz wave, and the like) having a wavelength of equal to or more than 30 micrometers and equal to or less than one meter. The electromagnetic wave transmission/reception unit 11 can be configured by adopting any technique. For example, as illustrated in the example in FIG. 8, the electromagnetic wave transmission/reception unit 11 may be a sensor panel in which a plurality of transmission antennas and a plurality of reception antennas are arranged. The plurality of transmission antennas irradiate an electromagnetic wave in a predetermined order by shifting a timing from one another. Further, all the plurality of reception antennas receive a reflection wave of the electromagnetic wave.

Note that, as compared with the estimation electromagnetic wave transmission/reception unit 21, the electromagnetic wave transmission/reception unit 11 has a configuration in which a reflection wave from the belongings 2 is received with less leakage.

For example, the electromagnetic wave transmission/reception unit 11 may include more transmission antennas and reception antennas than those of the estimation electromagnetic wave transmission/reception unit 21. Specifically, the number of estimation transmission antennas of the estimation electromagnetic wave transmission/reception unit 21 may be less than the number of transmission antennas of the electromagnetic wave transmission/reception unit 11, and the number of estimation reception antennas of the estimation electromagnetic wave transmission/reception unit 21 may be less than the number of reception antennas of the electromagnetic wave transmission/reception unit 11. When the number of transmission antennas (estimation transmission antennas) and the number of reception antennas (estimation reception antennas) are less, simply, an acquirable signal of a reflection wave decreases (an amount of data decreases). Consequently, sharpness of an image to be generated from the signal may be lowered. Further, the number of frequencies for use by the estimation electromagnetic wave transmission/reception unit 21 may be less than the number of frequencies to be used by the electromagnetic wave transmission/reception unit 11. In a case where the number of frequencies for use is reduced, sharpness of an image to be generated may be lowered.

Further, an aperture length of the electromagnetic wave transmission/reception unit 11 may be longer than that of the estimation electromagnetic wave transmission/reception unit 21. The aperture length is a distance between transmission antennas (estimation transmission antennas) located at both ends of a plurality of transmission antennas (estimation transmission antennas) in a left-right direction. Wt in FIG. 12 indicates the aperture length. Further, the aperture length is a distance between reception antennas (estimation reception antennas) located at both ends of a plurality of reception antennas (estimation reception antennas) in a left-right direction. Wr in FIG. 12 indicates the aperture length.

Note that, the aperture length may also conceptually include a distance between transmission antennas (estimation transmission antennas) located at both ends of a plurality of transmission antennas (estimation transmission antennas) in an up-down direction. Ht in FIG. 12 indicates the aperture length. Further, the aperture length may also conceptually include a distance between reception antennas (estimation reception antennas) located at both ends of a plurality of reception antennas (estimation reception antennas) in an up-down direction. Hr in FIG. 12 indicates the aperture length.

When the aperture length is short, reception leakage of a reflection wave may occur. For example, as illustrated in FIG. 2, in a state that the belongings 2 has an inclination with respect to a radar surface, reception leakage of a reflection wave (arrow in FIG. 2) being reflected on the belongings 2 may occur. In contrast, as illustrated in FIG. 4, when the aperture length is long, even in a state that the belongings 2 has an inclination with respect to a radar surface, as illustrated in FIG. 4, a reflection wave (arrow in FIG. 4) being reflected on the belongings 2 can be received.

Figure 12:
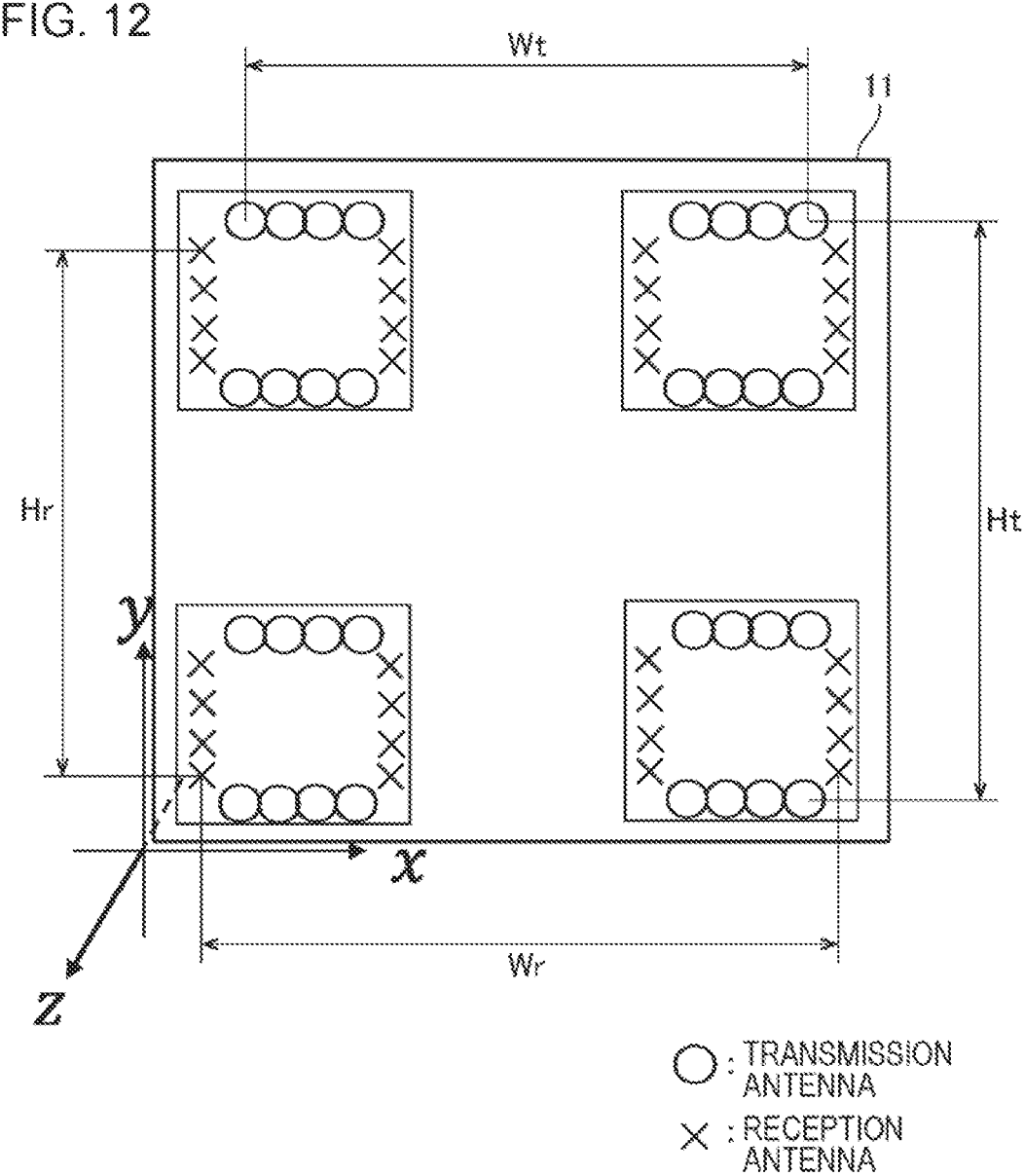
FIG. 12 is a diagram illustrating one example of a manner of arrangement of a transmission antenna and a reception antenna according to the present example embodiment.
Figure 13:
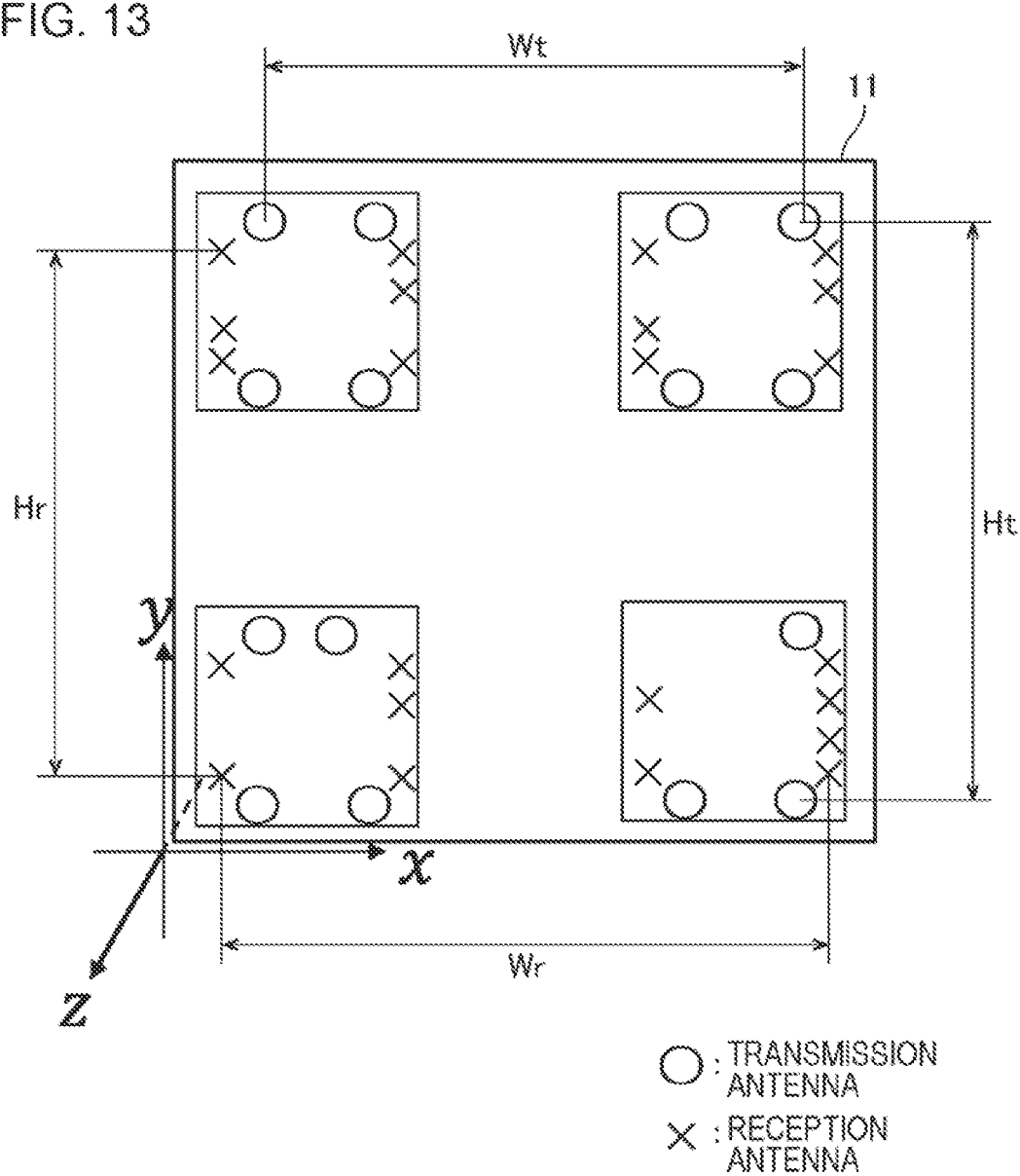
FIG. 13 is a diagram illustrating one example of a manner of arrangement of a transmission antenna and a reception antenna according to the present example embodiment.

Further, the electromagnetic wave reception unit 11 may include more transmission antennas and reception antennas than those of the estimation electromagnetic wave transmission/reception unit 21, but the above-described aperture lengths of the electromagnetic wave transmission/reception unit 11 and the estimation electromagnetic wave transmission/reception unit 21 may be the same. The example is illustrated in FIGS. 12 and 13. FIG. 12 is a configuration example of the electromagnetic wave transmission/reception unit 11, and FIG. 13 is a configuration example of the estimation electromagnetic wave transmission/reception unit 21. In a case of the illustrated example, the electromagnetic wave transmission/reception unit 11 includes more transmission antennas and reception antennas than those of the estimation electromagnetic wave transmission/reception unit 21. However, the above-described aperture lengths of the electromagnetic wave transmission/reception unit 11 and the estimation electromagnetic wave transmission/reception unit 21 are set to be substantially the same.

Figure 15:
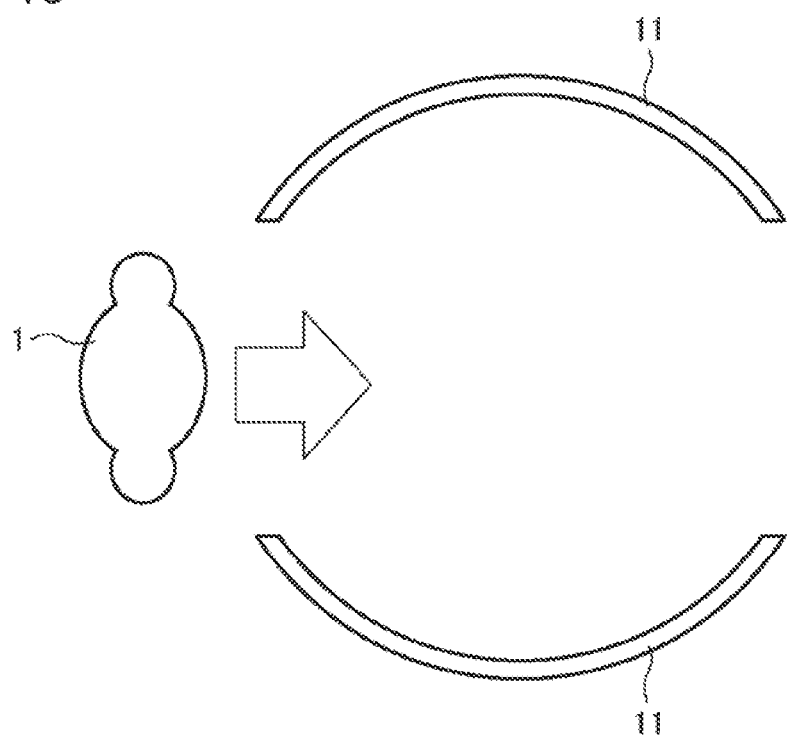
FIG. 15 is a diagram illustrating one example of a configuration of the electromagnetic wave transmission/reception unit according to the present example embodiment.
Figure 16:
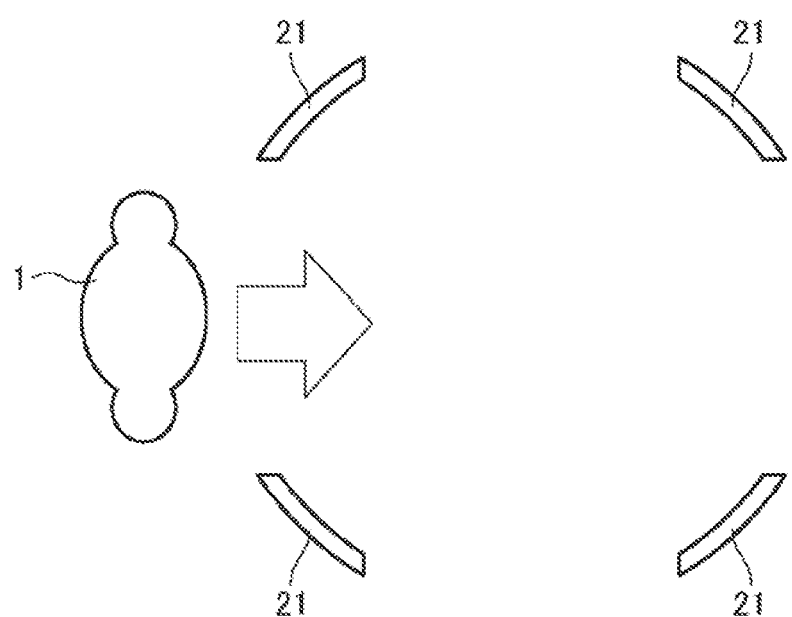
FIG. 16 is a diagram illustrating one example of a configuration of the estimation electromagnetic wave transmission/reception unit according to the present example embodiment.

FIGS. 12 and 13 achieve the above-described configuration that "more transmission antennas and reception antennas than those of the estimation electromagnetic wave transmission/reception unit 21 are provided, but the above-described aperture lengths of the electromagnetic wave transmission/reception unit 11 and the estimation electromagnetic wave transmission/reception unit 21 are the same" by devising a manner of arrangement of transmission antennas and reception antennas in one sensor panel. As another example, as illustrated in FIGS. 15 and 16, the above-described configuration that "more transmission antennas and reception antennas than those of the estimation electromagnetic wave transmission/reception unit 21 are provided, but the above-described aperture lengths of the electromagnetic wave transmission/reception unit 11 and the estimation electromagnetic wave transmission/reception unit 21 are the same" may be achieved by devising a manner of arrangement of transmission antennas and reception antennas over the entirety of a plurality of sensor panels.

Note that, as described in the example in FIGS. 2 and 4, a configuration of the electromagnetic wave transmission/reception unit 11 may be a configuration acquired by adding a partial configuration (added portion 3) to a configuration of the estimation electromagnetic wave transmission/reception unit 21. By doing so, it becomes possible to conceive that a signal of a reflection wave to be received by the electromagnetic wave transmission/reception unit 11 is substantially a combination of "a signal of a reflection wave to be acquired in a case where a configuration of the estimation electromagnetic wave transmission/reception unit 21 is adopted" and "a signal of a reflection wave to be acquired by an added partial configuration". In this case, for example, by removing "the signal of the reflection wave to be acquired by the added partial configuration" and generating the above-described learning image, based on "the signal of the reflection wave to be acquired in a case where the configuration of the estimation electromagnetic wave transmission/reception unit 21 is adopted", it becomes possible to generate an estimation model by machine learning based on an image (training data) generated in a substantially same condition (example: in a completely same condition) as a condition of an image to be used at an estimation time. Specifically, it becomes possible to completely match an acquisition environment (such as the number and a position of transmission and reception antennas, and a frequency for use and the number of frequencies) of data for learning image generation by the learning image generation unit 13, and an acquisition environment (such as the number and a position of transmission and reception antennas, and a frequency for use and the number of frequencies) of data for estimation image generation by the estimation image generation unit 22. Consequently, improvement of estimation accuracy and the like are expected.

Referring back to FIG. 11, the parameter setting unit 18 performs settings of various parameters regarding transmission and reception of an electromagnetic wave by the electromagnetic wave transmission/reception unit 11. For example, the parameter setting unit 18 sets an irradiation order of a plurality of estimation transmission antennas, a frequency of an electromagnetic wave to be irradiated by each estimation transmission antenna, an irradiation time of each estimation transmission antenna, and the like. For example, as illustrated in FIG. 9, it is possible to change a frequency of an electromagnetic wave to be irradiated from a plurality of transmission antennas according to time. The parameter setting unit 18 can perform settings of the above-described various parameters, based on user input. The electromagnetic wave transmission/reception unit 11 performs transmission and reception of an electromagnetic wave, based on various parameters set by the parameter setting unit 18.

Referring back to FIG. 11, the label determination image generation unit 12 generates a label determination image, based on a signal of a reflection wave received by the electromagnetic wave transmission/reception unit 11. Processing of generating an image, based on a signal of a received reflection wave, is similar to image generation processing described in the estimation image generation unit 22. The label determination image generation unit 12 generates a label determination image by using all or a major part of a signal of a reflection wave received by the electromagnetic wave transmission/reception unit 11. A label determination image to be generated as described above becomes an image having sharpness of a level at which a person can recognize an object within the image, as illustrated in FIG. 5.

Referring back to FIG. 11, the learning image generation unit 13 generates a learning image, based on a signal being a part of a signal of a reflection wave received by the electromagnetic wave transmission/reception unit 11, and less than a signal to be used in generation of a label determination image by the label determination image generation unit 12. A learning image to be generated as described above may have sharpness of a level at which a person cannot recognize an object within the image, although a computer can recognize the object within the image with sufficient accuracy. Specifically, a learning image may have sharpness of substantially the same level as that of an image to be generated by the above-described estimation image generation unit 22. Note that, processing of generating an image, based on a signal of a received reflection wave, is similar to image generation processing described in the estimation image generation unit 22.

Herein, a method of selecting a part of a signal to be used for learning image generation from a signal of a reflection wave received by the electromagnetic wave transmission/reception unit 11 is described.

For example, the learning image generation unit 13 may at random select a part of a signal to be used for learning image generation from a signal of a reflection wave received by the electromagnetic wave transmission/reception unit 11. The number of pieces of data to be selected is preferably set to be the same number as the number of pieces of data to be used in generation of an image by the estimation image generation unit 22.

As another example, the learning image generation unit 13 may select some of antennas from among a plurality of transmission antennas, and select, as a part of a signal to be used for learning image generation, a signal acquired by removing, from a signal of a reflection wave received by the electromagnetic wave transmission/reception unit 11, a signal of a reflection wave of an electromagnetic wave irradiated by the selected one of the transmission antennas.

Herein, one example of a method of selecting some of transmission antennas is described. For example, as illustrated in the example in FIGS. 2 and 4, in a case where it is assumed that a configuration of the electromagnetic wave transmission/reception unit 11 is a configuration acquired by adding a partial configuration (added portion 3) to a configuration of the estimation electromagnetic wave transmission/reception unit 21, the learning image generation unit 13 may select a transmission antenna of the added portion 3. In addition to the above, the learning image generation unit 13 may at random select a predetermined number of transmission antennas from among a plurality of transmission antennas. It is preferable that a position or the number, or both of them of transmission antennas not being selected and left is the same as a position or the number, or both of them of estimation transmission antennas included in the estimation electromagnetic wave transmission/reception unit 21.

As another example, the learning image generation unit 13 may select some of antennas from among a plurality of reception antennas, and select, as a part of a signal to be used for learning image generation, a signal acquired by removing, from a signal of a reflection wave received by the electromagnetic wave transmission/reception unit 11, a signal of a reflection wave received by the selected one of the reception antennas.

Herein, one example of a method of selecting some of reception antennas is described. For example, as illustrated in the example in FIGS. 2 and 4, in a case where it is assumed that a configuration of the electromagnetic wave transmission/reception unit 11 is a configuration acquired by adding a partial configuration (added portion 3) to a configuration of the estimation electromagnetic wave transmission/reception unit 21, the learning image generation unit 13 may select a reception antenna of the added portion 3. In addition to the above, the learning image generation unit 13 may at random select a predetermined number of reception antennas from among a plurality of reception antennas. It is preferable that a position or the number, or both of them of reception antennas not being selected and left is the same as a position or the number, or both of them of estimation reception antennas included in the estimation electromagnetic wave transmission/reception unit 21.

As another example, the learning image generation unit 13 may select some of transmission antennas from among a plurality of transmission antennas, and select some of reception antennas from among a plurality of reception antennas. Further, the learning image generation unit 13 may select, as a part of a signal to be used for learning image generation, a signal acquired by removing, from a signal of a reflection wave received by the electromagnetic wave transmission/reception unit 11, a signal of a reflection wave of an electromagnetic wave irradiated from the selected transmission antenna and a signal of a reflection wave received by the selected reception antenna.

Herein, one example of a method of selecting some of transmission antennas and reception antennas is described. For example, as illustrated in the example in FIGS. 2 and 4, in a case where it is assumed that a configuration of the electromagnetic wave transmission/reception unit 11 is a configuration acquired by adding a partial configuration (added portion 3) to a configuration of the estimation electromagnetic wave transmission/reception unit 21, the learning image generation unit 13 may select a transmission antenna and a reception antenna of the added portion 3. In addition to the above, the learning image generation unit 13 may at random select, as some of antennas to be removed, a predetermined number of transmission antennas and reception antennas from among a plurality of transmission antennas. Note that, it is preferable that a position and the number, or both of them of transmission antennas and reception antennas not being selected and left is the same as a position or the number, or both of them of estimation transmission antennas and estimation reception antennas included in the estimation electromagnetic wave transmission/reception unit 21.

As another example, as described above, in a case where the electromagnetic wave transmission/reception unit 11 irradiates an electromagnetic wave from a transmission antenna, while changing a frequency, the learning image generation unit 13 may select, as a part of a signal to be used for learning image generation, a signal acquired by removing, from a signal of a reflection wave received by the electromagnetic wave transmission/reception unit 11, a signal of a selected frequency.

Further, the learning image generation unit 13 may select some of antennas from among a plurality of transmission antennas, select some of antennas from a plurality of reception antennas, and select a part of a frequency from among frequencies for use. Further, the learning image generation unit 13 may select, as a part of a signal to be used for learning image generation, a signal acquired by removing, from a signal of a reflection wave received by the electromagnetic wave transmission/reception unit 11, a signal of a reflection wave of an electromagnetic wave irradiated from the selected one of the transmission antennas, a signal of a reflection wave received by the selected one of the reception antennas, and a signal of the selected frequency.

Referring back to FIG. 11, the label determination unit 14 determines a label, based on a label determination image generated by the label determination image generation unit 12.

For example, the label determination unit 14 may include a means for outputting a label determination image, and a means for accepting user input of a label (such as a name and a position of an object included in a label determination image) of the output label determination image. An output of a label determination image is achieved based on any image output apparatus such as a display, a projection apparatus, a printer, and a mailer. Further, user input of a label is achieved based on any input apparatus such as a keyboard, a mouse, a microphone, a physical button, and a touch panel, and any user interface (UI) screen.

As another example, an estimation model that estimates, from an image having sharpness of substantially the same level as that of a label determination image, a name and a position of an object included in the image, may be generated by machine learning in advance based on a labeled image (training data) having sharpness of substantially the same level as that of the label determination image. Further, the label determination unit 14 may estimate an object included in a label determination image, based on the label determination image and the estimation model, and determine an estimation result (such as a name and a position of an object), as a label of the label determination image.

The training data generation unit 15 generates training data in which a learning image generated by the learning image generation unit 13 and a label determined by the label determination unit 14 are associated, and causes the training data storage unit 16 to store the generated training data.

The estimation model generation unit 17 generates, from an image generated based on a signal of a reflection wave of an electromagnetic wave, an estimation model that estimates an object included in the image by machine learning based on training data stored by the training data storage unit 16.

Next, one example of a flow of processing of the processing apparatus 10 is described with reference to a flowchart in FIG. 14.

First, the electromagnetic wave reception unit 11 irradiates an electromagnetic wave from a transmission antenna, and receives a reflection wave by a reception antenna (S20).

Subsequently, the label determination image generation unit 12 generates a label determination image, based on a signal of the reflection wave received in S20 (S23). Subsequently, the label determination unit 14 displays the label determination image, for example, on a display (S24), and accepts user input of a label of the displayed label determination image (S25).

Further, after S20, the learning image generation unit 13 selects a part of a signal to be used for learning image generation from a signal of the reflection wave received in S20 (S21). Then, the learning image generation unit 13 generates a learning image, based on the selected part of the signal (S22). Note that, a signal (data) to be used in generation of a learning image is less than a signal (data) to be used in generation of a label determination image.

Subsequently, the training data generation unit 15 generates training data in which the learning image generated in S22 and the label input in S25 are associated, and causes the training data storage unit 16 to store the generated training data (S26). Thereafter, by repeating similar processing, pieces of training data are accumulated in the training data storage unit 16.

Figure 14:
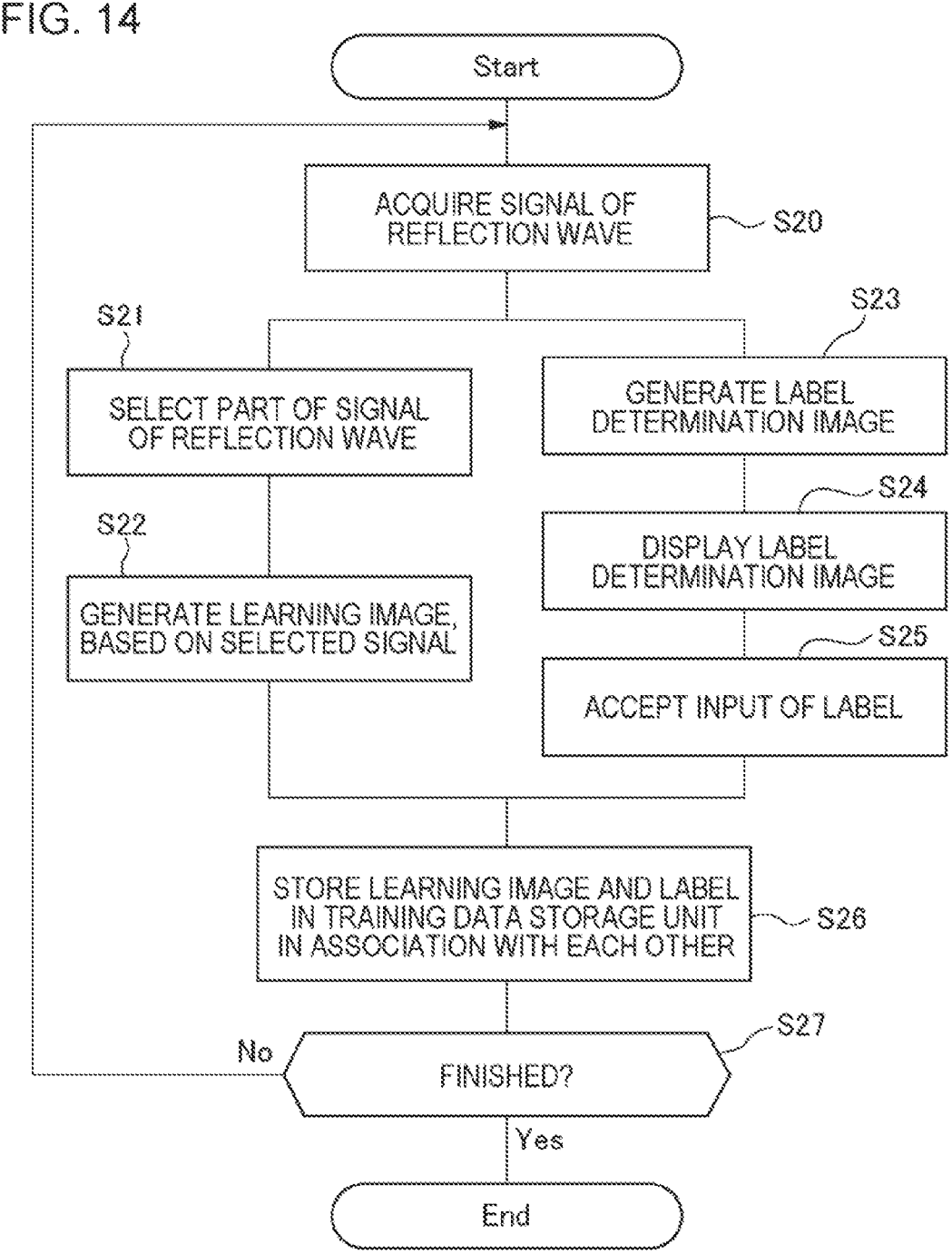
FIG. 14 is a flowchart illustrating one example of a flow of processing of the processing apparatus according to the present example embodiment.

Note that, in the processing example in FIG. 14, each time a signal of a reflection wave is received, a series of pieces of processing of generation of a learning image (S21 and S22), generation of a label determination image (S23), determination of a label (S24 and S25), and generation and accumulation of training data (S26) are performed.

As a modification example, processing of performing generation of a learning image (S21 and S22) and generation of a label determination image (S23), and processing of performing determination of a label (S24 and S25) and generation and accumulation of training data (S26) may be separated from each other, and each piece of the processing may be independently performed.

Specifically, each time a signal of a reflection wave is received (S20), a learning image and a label determination image may be generated by performing only generation of a learning image (S21 and S22) and generation of a label determination image (S23), and the learning image and the label determination image may be stored in a storage means in association with each other. By repeating the processing, pieces of information in which a learning image and a label determination image are associated are accumulated in the storage means.

Then, at any timing thereafter, labeling processing (determination of a label (S24 and S25) and generation and accumulation of training data (S26)) may be performed for a plurality of learning images accumulated in the storage means by batch processing.

"Advantageous Effect of Estimation System"

The estimation system described above sufficiently reduces, within a range where an estimation result having sufficient accuracy is acquired by a computer, an amount of data to be used in generation of an image to be used in processing of estimating belongings of the person 1 (an amount of data to be used in generation of an image to be used in estimation processing by the estimation apparatus 20, and an amount of data to be used in generation of an image serving as training data). Consequently, reduction of processing load on a computer, miniaturization of a sensor device and reduction of cost burden by reduction of the number of transmission/reception antennas, shortening of an irradiation time and suppression of motion blur by reduction of the number of transmission antennas, and the like are achieved.

Further, the estimation system according to the present example embodiment performs irradiation of an electromagnetic wave onto an object and reception of a reflection wave in a scene where an estimation model is generated by using the electromagnetic wave transmission/reception unit 11 having a configuration capable of acquiring a large amount of data on a reflection wave as compared with the estimation electromagnetic wave transmission/reception unit 21 being actually installed and used at an airport and the like. Further, the estimation system according to the present example embodiment generates, based on a signal of a reflection wave received by the electromagnetic wave transmission/reception unit 11, a label determination image having sharpness of a level at which a person can recognize an object within an image, and a learning image having sharpness of substantially the same level as that of an image to be used in estimation processing by the estimation apparatus 20. Further, training data are generated by associating a label determined based on the label determination image and the learning image. According to a configuration as described above, even when an amount of data to be used in generation of an image to be used in processing of estimating belongings of the person 1 as described above is reduced, it is possible to perform a labeling operation without a problem.

Further, the estimation system according to the present example embodiment can select, from a signal of a reflection wave received by the electromagnetic wave transmission/reception unit 11, a part of a signal to be used for learning image generation by a characteristic method. For example, it is possible to select some of transmission antennas and reception antennas, and remove a signal of a reflection wave by an electromagnetic wave transmitted from the selected one of the transmission antennas, and a signal of a reflection wave received by the selected one of the reception antennas. In this case, by appropriately selecting some of transmission antennas and reception antennas, a signal to be used in learning image generation becomes similar to "a signal of a reflection wave to be acquired in a case where a configuration of the estimation electromagnetic wave transmission/reception unit 21 is adopted". Further, it becomes possible to generate the above-described learning image, based on "the signal of the reflection wave to be acquired in a case where the configuration of the estimation electromagnetic wave transmission/reception unit 21 is adopted". Consequently, it becomes possible to generate an estimation model by machine learning based on an image (training data) generated in a substantially same condition as that of an image to be used at an estimation time, and improvement of estimation accuracy and the like are expected.

Second Example Embodiment

An estimation system according to the present example embodiment has a similar configuration regarding an electromagnetic wave transmission/reception unit 11 and an estimation electromagnetic wave transmission/reception unit 21. Specifically, the number of transmission antennas constituting the electromagnetic wave transmission/reception unit 11 and the number of estimation transmission antennas constituting the estimation electromagnetic wave transmission/reception unit 21 are the same, and a manner of arrangement of the antennas is the same. Further, the number of reception antennas constituting the electromagnetic wave transmission/reception unit 11 and the number of estimation reception antennas constituting the estimation electromagnetic wave transmission/reception unit 21 are the same, and a manner of arrangement of the antennas is the same.

A parameter setting unit 18 and an estimation parameter setting unit 25 according to the present example embodiment set values of various parameters to the same value as each other. Specifically, an irradiation order of each of a plurality of transmission antennas is the same as that of an associated estimation transmission antenna (whose arrangement position is the same) among a plurality of estimation transmission antennas. Further, a frequency of an electromagnetic wave to be irradiated by each of the plurality of transmission antennas is the same as that of an associated estimation transmission antenna (whose arrangement position is the same) among the plurality of estimation transmission antennas. Further, an irradiation time of each of the plurality of transmission antennas is the same as an irradiation time of an associated estimation transmission antenna (whose arrangement position is the same) among the plurality of estimation transmission antennas.

Further, an estimation image generation unit 22 generates an estimation image, based on a part of a signal from a signal of a reflection wave received by the estimation electromagnetic wave transmission/reception unit 21.

Herein, a method of selecting a part of a signal to be used for estimation image generation from a signal of a reflection wave received by the estimation electromagnetic wave transmission/reception unit 21 is described.

For example, the estimation image generation unit 22 may select at random a signal to be used in generation of an estimation image from a signal of a reflection wave received by the estimation electromagnetic wave transmission/reception unit 21.

Further, the estimation image generation unit 22 may select, as a signal to be used in generation of an estimation image, a signal acquired by removing, from a signal of a reflection wave received by the estimation electromagnetic wave transmission/reception unit 21, at least either one of a signal of a reflection wave based on an electromagnetic wave irradiated from the selected estimation transmission antenna and a signal of a reflection wave received by the selected estimation reception antenna.

Further, the estimation image generation unit 22 may select, as a signal to be used in generation of an estimation image, a signal acquired by removing, from a signal of a reflection wave received by the estimation electromagnetic wave transmission/reception unit 21, a signal of a selected frequency.

These methods by the estimation image generation unit 22 are similar to "a method of selecting a part of a signal to be used for learning image generation from a signal of a reflection wave received by the electromagnetic wave transmission/reception unit 11" by the learning image generation unit 13 described in the first example embodiment.

Note that, the estimation image generation unit 22 and a learning image generation unit 13 are preferably select, by the same method, a part of a signal to be used for estimation image generation and learning image generation from a signal of a reflection wave received by the estimation electromagnetic wave transmission/reception unit 21 and the electromagnetic wave transmission/reception unit 11.

Figure 17:
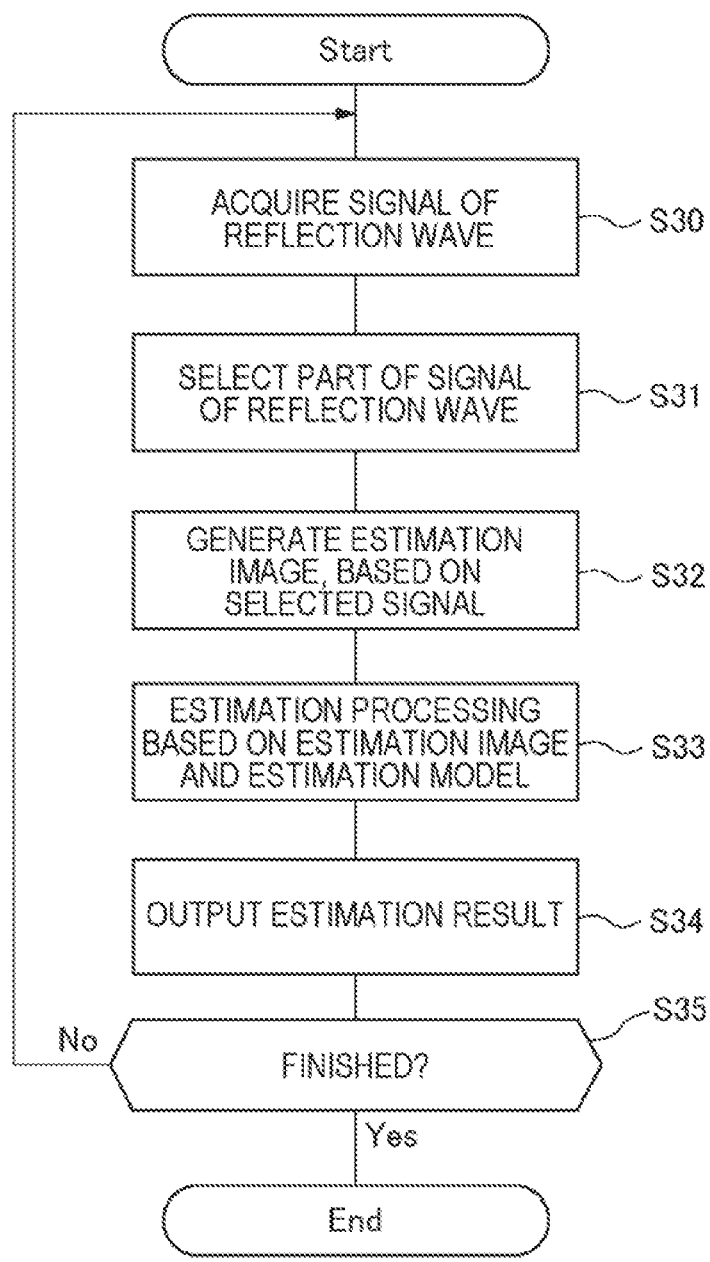
FIG. 17 is a flowchart illustrating one example of a flow of processing of the estimation apparatus according to the present example embodiment.

Next, one example of a flow of processing of an estimation apparatus 20 is described with reference to a flowchart in FIG. 17.

When processing is started, the estimation electromagnetic wave transmission/reception unit 21 repeats, at a predetermined interval, irradiation of an electromagnetic wave having a wavelength of equal to or more than 30 micrometers and equal to or less than one meter, and reception of a reflection wave. Then, when acquiring a signal of the above-described reflection wave output from the estimation electromagnetic wave transmission/reception unit 21 (S20), the estimation image generation unit 22 selects a part of a signal to be used in estimation image generation from the acquired signal (S31). Then, the estimation image generation unit 22 generates an estimation image, based on the selected signal (S32).

Next, an estimation unit 23 estimates an object included in the estimation image, based on the estimation image generated by the estimation image generation unit 22 in S32, and an estimation model stored in advance in an estimation model storage unit 24 (S33).

Then, the estimation apparatus 20 outputs an estimation result (S34). For example, the estimation apparatus 20 may output the estimation result via any output apparatus such as a display, a projection apparatus, a speaker, a printer, and a mailer. The estimation result includes information (such as a name) regarding an object being estimated to be included in the estimation image.

In addition to the above, in a case where the estimation apparatus 20 estimates that a predetermined object is included in an estimation image, the estimation apparatus 20 may perform warning processing. The warning processing is turning on a warning lamp, outputting a warning sound, outputting warning information via an output apparatus such as a display, and the like, but is not limited thereto. The predetermined object is an object carrying of which is not allowed at the place, and a hazardous object such as, for example, a gun and a knife is exemplified.

The other configuration of a processing system according to the present example embodiment is similar to the processing system according to the first example embodiment.

The estimation system according to the present example embodiment described above improves, in a technique for estimating an object included in an image, based on an estimation model generated by a labeled image (training data) based on a signal of an electromagnetic wave, difficulty in a labeling operation resulting from reduction of a signal of an electromagnetic wave (reduction of an amount of data) for use in image generation within a range where an estimation result having sufficient accuracy is acquired.

Further, although the estimation system according to the present example embodiment cannot achieve "miniaturization of a sensor device and reduction of cost burden by reduction of the number of transmission/reception antennas, shortening of an irradiation time and suppression of motion blur by reduction of the number of transmission antennas, and the like", which is achieved by the processing system according to the first example embodiment, the estimation system can achieve reduction of processing load on a computer by reduction of an amount of data to be used in generation of an image to be used in processing of estimating belongings of a person 1 (an amount of data to be used in generation of an image to be used in estimation processing by the estimation apparatus 20, and an amount of data to be used in generation of an image serving as training data).

Further, in the estimation system according to the present example embodiment, the estimation image generation unit 22 and the learning image generation unit 13 can select, by the same method, a part of a signal to be used for estimation image generation and learning image generation, from a signal of a reflection wave received by the estimation electromagnetic wave transmission/reception unit 21 and the electromagnetic wave transmission/reception unit 11. In this case, it becomes possible to generate an estimation model by machine learning based on an image (training data) generated in a substantially same condition as that of an image to be used at an estimation time, and improvement of estimation accuracy and the like are expected.

While the invention of the present application has been described with reference to the example embodiments (and examples), the invention of the present application is not limited to the above-described example embodiments (and examples). A configuration and details of the invention of the present application may be modified in various ways comprehensible to a person skilled in the art within the scope of the invention of the present application.

A part or all of the above-described example embodiments may also be described as the following supplementary notes, but is not limited to the following.

1. A processing apparatus including:
    an electromagnetic wave transmission/reception means for irradiating an electromagnetic wave from a transmission antenna, and receiving a reflection wave by a reception antenna;
    a label determination image generation means for generating a label determination image, based on a signal of the received reflection wave;
    a learning image generation means for generating a learning image, based on a signal being a part of a signal of the received reflection wave, and less than a signal to be used in generation of the label determination image;
    a label determination means for determining a label, based on the label determination image; and
    a training data generation means for generating training data in which the learning image and the label are associated, and causing training data storage means to store the generated training data.
2. The processing apparatus according to supplementary note 1, further including
    an estimation model generation means for generating an estimation model by machine learning based on the training data stored by the training data storage means.
3. The processing apparatus according to supplementary note 1 or 2, wherein
    the label determination image generation means includes
      a means for outputting the label determination image, and
      a means for accepting user input of the label of the output label determination image.
4. The processing apparatus according to any one of supplementary notes 1 to 3, wherein
    the learning image generation means at random selects a signal to be used in generation of the learning image from a signal of the received reflection wave.
5. The processing apparatus according to any one of supplementary notes 1 to 3, wherein
    the electromagnetic wave transmission/reception means irradiates an electromagnetic wave from a plurality of the transmission antennas, and receives a reflection wave by a plurality of the reception antennas, and
    the learning image generation means selects, as a signal to be used in generation of the learning image, a signal acquired by removing, from a signal of the received reflection wave, at least either one of a signal of the reflection wave based on the electromagnetic wave irradiated from a selected one of the transmission antennas, and a signal of the reflection wave received by a selected one of the reception antennas.
6. The processing apparatus according to any one of supplementary notes 1 to 3, and 5, wherein
    the electromagnetic wave transmission/reception means irradiates the electromagnetic wave from the transmission antenna, while changing a frequency, and
    the learning image generation means selects, as a signal to be used in generation of the learning image, a signal acquired by removing, from a signal of the received reflection wave, a signal of a selected frequency.

7. An estimation apparatus including:
- an estimation model storage means for storing an estimation model generated by a processing apparatus including
- an electromagnetic wave transmission/reception means for irradiating an electromagnetic wave from a transmission antenna, and receiving a reflection wave by a reception antenna,
- a label determination image generation means for generating a label determination image, based on a signal of the received reflection wave,
- a learning image generation means for generating a learning image, based on a signal being a part of a signal of the received reflection wave, and less than a signal to be used in generation of the label determination image,
- a label determination means for determining a label, based on the label determination image,
- a training data generation means for generating training data in which the learning image and the label are associated, and causing training data storage means to store the generated training data, and
- an estimation model generation means for generating the estimation model by machine learning based on the training data stored by the training data storage means;
- an estimation electromagnetic wave transmission/reception means for irradiating an electromagnetic wave from an estimation transmission antenna, and receiving a reflection wave by an estimation reception antenna;
- an estimation image generation means for generating an estimation image, based on a signal of the received reflection wave; and
- an estimation means for estimating an object included in the estimation image, based on the estimation image and the estimation model.

8. The estimation apparatus according to supplementary note 7, wherein
- the electromagnetic wave transmission/reception means irradiates an electromagnetic wave from a plurality of the transmission antennas, and receiving a reflection wave by a plurality of the reception antennas,
- the estimation electromagnetic wave transmission/reception means irradiates an electromagnetic wave from a plurality of the estimation transmission antennas, and receiving a reflection wave by a plurality of the estimation reception antennas, and
- the electromagnetic wave transmission/reception means and the estimation electromagnetic wave transmission/reception means have a same configuration,
- the estimation apparatus further including
a parameter setting means for making an irradiation order and an irradiation time of a plurality of the estimation transmission antennas, and an irradiation order and an irradiation time of a plurality of the transmission antennas the same as each other.

9. The estimation apparatus according to supplementary note 8, wherein
- the estimation image generation means generates the estimation image, based on a part of a signal a signal of the reflection wave received by the estimation electromagnetic wave transmission/reception means.

10. The estimation apparatus according to supplementary note 9, wherein
- the estimation image generation means at random selects a signal to be used in generation of the estimation image from a signal of the reflection wave received by the estimation electromagnetic wave transmission/reception means.

11. The estimation apparatus according to supplementary notes 9, wherein
- the estimation image generation means selects, as a signal to be used in generation of the estimation image, a signal acquired by removing, from a signal of the reflection wave received by the estimation electromagnetic wave transmission/reception means, at least either one of a signal of the reflection wave based on the electromagnetic wave irradiated from a selected one of the estimation transmission antennas, and a signal of the reflection wave received by a selected one of the estimation reception antennas.

12. The estimation apparatus according to supplementary note 9 or 11, wherein
- the estimation electromagnetic wave transmission/reception means irradiates the electromagnetic wave from the estimation transmission antenna, while changing a frequency, and
- the estimation image generation means selects, as a signal to be used in generation of the estimation image, a signal acquired by removing, from a signal of the reflection wave received by the estimation electromagnetic wave transmission/reception means, a signal of a selected frequency.

13. The estimation apparatus according to supplementary note 7, wherein
- the electromagnetic wave transmission/reception means irradiates an electromagnetic wave from a plurality of the transmission antennas, and receives a reflection wave by a plurality of the reception antennas,
- the estimation electromagnetic wave transmission/reception means irradiates an electromagnetic wave from a plurality of the estimation transmission antennas, and receives a reflection wave by a plurality of the estimation reception antennas,
- the number of the estimation transmission antennas for irradiating an electromagnetic wave is less than the number of the transmission antennas for irradiating an electromagnetic wave, and
- the number of the estimation reception antennas for receiving a reflection wave is less than the number of the reception antennas for receiving a reflection wave.

14. The estimation apparatus according to supplementary note 13, wherein
- a distance between the estimation transmission antennas located at both ends of a plurality of the estimation transmission antennas in a left-right direction, and a distance between the transmission antennas located at both ends of a plurality of the transmission antennas in a left-right direction are the same.

15. The estimation apparatus according to supplementary note 13 or 14, wherein
- a distance between the estimation reception antennas located at both ends of a plurality of the estimation reception antennas in a left-right direction, and a distance between the reception antennas located at both ends of a plurality of the reception antennas in a left-right direction are the same.

16. A processing method including:
- by a computer,
  - irradiating an electromagnetic wave from a transmission antenna, and receiving a reflection wave by a reception antenna;
  - generating a label determination image, based on a signal of the received reflection wave;

generating a learning image, based on a signal being a part of a signal of the received reflection wave, and less than a signal to be used in generation of the label determination image;

determining a label, based on the label determination image; and generating training data in which the learning image and the label are associated, and causing training data storage means to store the generated training data.

17. An estimation method including:

by a computer, storing an estimation model generated by a processing apparatus including an electromagnetic wave transmission/reception means for irradiating an electromagnetic wave from a transmission antenna, and receiving a reflection wave by a reception antenna, a label determination image generation means for generating a label determination image, based on a signal of the received reflection wave, a learning image generation means for generating a learning image, based on a signal being a part of a signal of the received reflection wave, and less than a signal to be used in generation of the label determination image, a label determination means for determining a label, based on the label determination image, a training data generation means for generating training data in which the learning image and the label are associated, and causing a training data storage means to store the generated training data, and an estimation model generation means for generating the estimation model by machine learning based on the training data stored by the training data storage means;

irradiating an electromagnetic wave from an estimation transmission antenna, and receiving a reflection wave by an estimation reception antenna;

generating an estimation image, based on a signal of the received reflection wave; and estimating an object included in the estimation image, based on the estimation image and the estimation model.

What is claimed is:

1. A processing apparatus comprising:

at least one memory configured to store one or more instructions; and at least one processor configured to execute the one or more instructions to:

irradiate an electromagnetic wave from a transmission antenna, and receive a reflection wave by a reception antenna;

generate a label determination image, based on a signal of the received reflection wave;

generate a learning image, based on a part of a signal used in generation of the label determination image;

determine a label, based on the label determination image; and generate training data in which the learning image and the label are associated, and cause a storage apparatus to store the generated training data, wherein a distance between estimation reception antennas located at both ends of a plurality of an estimation reception antennas in a left-right direction, and a distance between the reception antennas located at both ends of a plurality of the reception antennas in a left-right direction are a same, the plurality of the estimation reception antennas being used for estimating an object included in an estimation image.

2. The processing apparatus according to claim 1, wherein the processor is further configured to execute the one or more instructions to generate an estimation model by machine learning based on the training data stored by the storage apparatus.

3. The processing apparatus according to claim 1, wherein the processor is further configured to execute the one or more instructions to:

output the label determination image, and accept user input of the label of the output label determination image.

4. The processing apparatus according to claim 1, wherein the processor is further configured to execute the one or more instructions to select a signal at random to be used in generation of the learning image from a signal of the received reflection wave.

5. The processing apparatus according to claim 1, wherein the processor is further configured to execute the one or more instructions to:

irradiate an electromagnetic wave from a plurality of the transmission antennas, and receive a reflection wave by a plurality of the reception antennas, and select, as a signal to be used in generation of the learning image, a signal acquired by removing, from a signal of the received reflection wave, at least either one of a signal of the reflection wave based on the electromagnetic wave irradiated from a selected one of the transmission antennas, and a signal of the reflection wave received by a selected one of the reception antennas.

6. The processing apparatus according to claim 1, wherein the processor is further configured to execute the one or more instructions to:

irradiate the electromagnetic wave from the transmission antenna, while changing a frequency, and select, as a signal to be used in generation of the learning image, a signal acquired by removing, from a signal of the received reflection wave, a signal of a selected frequency.

7. An estimation apparatus comprising:

at least one memory configured to store one or more instructions; and at least one processor configured to execute the one or more instructions to:

store an estimation model generated by a processing apparatus which:

irradiates an electromagnetic wave from a transmission antenna, and receives a reflection wave by a reception antenna, generates a label determination image, based on a signal of the received reflection wave, generates a learning image, based on a part of a signal used in generation of the label determination image, determines a label, based on the label determination image, generates training data in which the learning image and the label are associated, and causes a storage apparatus to store the generated training data, and generates the estimation model by machine learning based on the training data stored by the storage apparatus;

irradiate an electromagnetic wave from an estimation transmission antenna, and receive a reflection wave by an estimation reception antenna;

generate an estimation image, based on a signal of the received reflection wave; and estimate an object included in the estimation image, based on the estimation image and the estimation model, wherein a distance between the estimation reception antennas located at both ends of a plurality of the estimation reception antennas in a left-right direction, and a distance between the reception antennas located at both ends of a plurality of the reception antennas in a left-right direction are a same.

8. The estimation apparatus according to claim 7, wherein the processor is further configured to execute the one or more instructions to:

irradiate an electromagnetic wave from a plurality of the transmission antennas, and receive a reflection wave by a plurality of the reception antennas, irradiate an electromagnetic wave from a plurality of the estimation transmission antennas, and receive a reflection wave by a plurality of the estimation reception antennas, and make an irradiation order and an irradiation time of a plurality of the estimation transmission antennas, and an irradiation order and an irradiation time of a plurality of the transmission antennas a same as each other.

9. The estimation apparatus according to claim 8, wherein the processor is further configured to execute the one or more instructions to generate t the estimation image, based on a part of a signal in a received signal of the reflection wave.

10. The estimation apparatus according to claim 9, wherein the processor is further configured to execute the one or more instructions to select a signal at random to be used in generation of the estimation image from a received signal of the reflection wave.

11. The estimation apparatus according to claim 9, wherein the processor is further configured to execute the one or more instructions to select, as a signal to be used in generation of the estimation image, a signal acquired by removing, from a received signal of the reflection wave, at least either one of a signal of the reflection wave based on the electromagnetic wave irradiated from a selected one of the estimation transmission antennas, and a signal of the reflection wave received by a selected one of the estimation reception antennas.

12. The estimation apparatus according to claim 9, wherein the processor is further configured to execute the one or more instructions to:

irradiate the electromagnetic wave from the estimation transmission antenna, while changing a frequency, and select, as a signal to be used in generation of the estimation image, a signal acquired by removing, from a received signal of the reflection wave, a signal of a selected frequency.

13. The estimation apparatus according to claim 7, wherein the processor is further configured to execute the one or more instructions to:

irradiate an electromagnetic wave from a plurality of the transmission antennas, and receive a reflection wave by a plurality of the reception antennas, irradiate an electromagnetic wave from a plurality of the estimation transmission antennas, and receive a reflection wave by a plurality of the estimation reception antennas, a number of the estimation transmission antennas for irradiating an electromagnetic wave is less than a number of the transmission antennas for irradiating an electromagnetic wave, and a number of the estimation reception antennas for receiving a reflection wave is less than a number of the reception antennas for receiving a reflection wave.

14. The estimation apparatus according to claim 13, wherein a distance between the estimation transmission antennas located at both ends of a plurality of the estimation transmission antennas in a left-right direction, and a distance between the transmission antennas located at both ends of a plurality of the transmission antennas in a left-right direction are a same.

15. A processing method performed by a computer and comprising:

irradiating an electromagnetic wave from a transmission antenna, and receiving a reflection wave by a reception antenna;

generating a label determination image, based on a signal of the received reflection wave;

generating a learning image, based on a part of a signal used in generation of the label determination image;

determining a label, based on the label determination image; and generating training data in which the learning image and the label are associated, and causing the generated training data to be stored, wherein a distance between estimation reception antennas located at both ends of a plurality of an estimation reception antennas in a left-right direction, and a distance between the reception antennas located at both ends of a plurality of the reception antennas in a left-right direction are a same, the plurality of the estimation reception antennas being used for estimating an object included in an estimation image.

* * * * *